(12) United States Patent
Kodera et al.

(10) Patent No.: US 10,933,909 B2
(45) Date of Patent: Mar. 2, 2021

(54) VEHICLE CONTROL APPARATUS

(71) Applicant: JTEKT CORPORATION, Osaka (JP)

(72) Inventors: Takashi Kodera, Okazaki (JP);
Masayuki Kita, Okazaki (JP)

(73) Assignee: JTEKT CORPORATION, Osaka (JP)

( * ) Notice: Subject to any disclaimer, the term of this patent is extended or adjusted under 35 U.S.C. 154(b) by 364 days.

(21) Appl. No.: 16/136,565

(22) Filed: Sep. 20, 2018

(65) Prior Publication Data

US 2019/0092384 A1    Mar. 28, 2019

(30) Foreign Application Priority Data

Sep. 27, 2017 (JP) .............................. JP2017-186607

(51) Int. Cl.
*B62D 6/00* (2006.01)
*B62D 5/00* (2006.01)
(Continued)

(52) U.S. Cl.
CPC ............. *B62D 6/008* (2013.01); *B60W 30/00* (2013.01); *B62D 1/166* (2013.01); *B62D 5/006* (2013.01); *B62D 6/002* (2013.01); *B60W 10/20* (2013.01); *B62D 5/04* (2013.01); *B62D 6/10* (2013.01); *G01L 5/22* (2013.01)

(58) Field of Classification Search
CPC .......... B62D 5/04; B62D 6/008; B62D 1/166; B62D 5/006; B62D 6/002; B60W 30/00
See application file for complete search history.

(56) References Cited

U.S. PATENT DOCUMENTS 9,802,645 B2 * 10/2017 Kudo .................. B62D 15/025
9,889,879 B2 *  2/2018 Namikawa ............ B62D 6/006
(Continued)

FOREIGN PATENT DOCUMENTS

DE      198 21 024 A1    11/1998
EP       1 652 753 A1     5/2006
(Continued)

OTHER PUBLICATIONS

Feb. 20, 2019 partial Extended Search Report issued in European Patent Application No. 18196799.3.
(Continued)

*Primary Examiner* — Ruth Ilan
*Assistant Examiner* — Michael R Stabley
(74) *Attorney, Agent, or Firm* — Oliff PLC

(57) ABSTRACT

A control apparatus calculates an axial force deviation, which is a difference between an estimated axial force and an ideal axial force based on a target pinion angle of a pinion shaft in association with a turning operation of steered wheels. The estimated axial force is based on a state variable that reflects vehicle behavior or a road condition. The control apparatus includes a steering angle ratio change control circuit configured to calculate a target pinion angle serving as a basis for calculation of the command value. The steering angle ratio change control circuit calculates a speed increasing ratio from a steering angle ratio set based on a vehicle speed and a base gear ratio of a steering mechanism, and calculates a correction angle for a target steering angle by multiplying the speed increasing ratio and the target steering angle together.

10 Claims, 11 Drawing Sheets

(51) Int. Cl.
    *B62D 1/16*     (2006.01)
    *B60W 30/00*     (2006.01)
    *G01L 5/22*     (2006.01)
    *B62D 6/10*     (2006.01)
    *B60W 10/20*     (2006.01)
    *B62D 5/04*     (2006.01)

(56) References Cited

U.S. PATENT DOCUMENTS

| | | | | |
|---|---|---|---|---|
| 9,937,954 | B2* | 4/2018 | Kudo | B62D 6/02 |
| 10,099,722 | B2* | 10/2018 | Kodera | B62D 6/002 |
| 10,131,379 | B2* | 11/2018 | Kodera | B62D 6/008 |
| 10,661,829 | B2* | 5/2020 | Badiru | B62D 6/002 |
| 2006/0037806 | A1* | 2/2006 | Kasahara | B62D 6/008 |
| | | | | 180/402 |
| 2014/0229068 | A1* | 8/2014 | Ueyama | B62D 15/0255 |
| | | | | 701/41 |
| 2015/0353126 | A1* | 12/2015 | Chai | B62D 5/0463 |
| | | | | 701/42 |
| 2017/0021858 | A1* | 1/2017 | Kodera | B62D 5/008 |
| 2017/0021859 | A1 | 1/2017 | Kodera | |
| 2017/0113720 | A1* | 4/2017 | Kodera | B62D 5/008 |

FOREIGN PATENT DOCUMENTS

| | | |
|---|---|---|
| EP | 2 803 558 A2 | 11/2014 |
| EP | 2 944 545 A1 | 11/2015 |
| EP | 3 130 526 A1 | 2/2017 |
| GB | 2 259 892 A | 3/1993 |
| JP | 2014-148299 A | 8/2014 |

OTHER PUBLICATIONS

May 31, 2019 extended European Search Report issued in European Patent Application No. 18196799.3.

* cited by examiner

VEHICLE CONTROL APPARATUS

INCORPORATION BY REFERENCE

The disclosure of Japanese Patent Application No. 2017-186607 filed on Sep. 27, 2017 including the specification, drawings and abstract, is incorporated herein by reference in its entirety.

BACKGROUND OF THE INVENTION

1. Field of the Invention

The present invention relates to a vehicle control apparatus.

2. Description of the Related Art

Hitherto, there is known a so-called steer-by-wire type steering system in which a steering wheel and steered wheels are mechanically separated from each other. This steering system includes a reaction motor and a steering operation motor. The reaction motor is a source of a steering reaction force to be applied to a steering shaft. The steering operation motor is a source of a steering operation force for turning the steered wheels. When a vehicle is traveling, a control apparatus of the steering system generates the steering reaction force through the reaction motor, and turns the steered wheels through the steering operation motor.

In the steer-by-wire type steering system, it is not likely that a road reaction force applied to the steered wheels is transmitted to the steering wheel because the steering wheel and the steered wheels are mechanically separated from each other. Thus, it is difficult for the driver to grasp a road condition as the steering reaction force (tactile feedback) that may be felt by the hands through the steering wheel.

For example, a control apparatus described in Japanese Patent Application Publication No. 2014-148299 (JP 2014-148299 A) calculates a feedforward axial force and a feedback axial force. The feedforward axial force is an ideal rack axial force based on a steering angle. The feedback axial force is an estimated axial force based on state variable s of the vehicle (lateral acceleration, steering operation current, and yaw rate). The feedback axial force is calculated based on a blended axial force obtained by summing up, at predetermined blending ratios, axial forces calculated individually for the state variable s of the vehicle. The control apparatus calculates a final axial force by summing up the feedforward axial force and the feedback axial force at predetermined blending ratios, and controls the reaction motor based on the final axial force. The feedback axial force reflects a road condition (road information), and therefore the steering reaction force generated by the reaction motor also reflects the road information. Thus, the driver can grasp the road information as the steering reaction force.

In recent years, the steering system is required to have a higher operability from the viewpoint of reducing driving stress of the driver and improving comfort.

SUMMARY OF THE INVENTION

It is one object of the present invention to provide a vehicle control apparatus capable of attaining a higher operability.

A vehicle control apparatus according to one aspect of the present invention is a vehicle control apparatus configured to control a motor based on a command value to be calculated based on a steering condition. The motor is a source of a driving force to be applied to a steering mechanism of a vehicle. The vehicle control apparatus includes a first calculation circuit, a second calculation circuit, and a third calculation circuit. The first calculation circuit is configured to calculate a first component of the command value based on at least a steering torque. The second calculation circuit is configured to calculate a target rotation angle of a rotating body based on a basic drive torque, which is a total sum of the steering torque and the first component. The rotating body is configured to rotate in association with a turning operation of a steered wheel. The third calculation circuit is configured to calculate a second component of the command value through feedback control performed so that an actual rotation angle of the rotating body equals the target rotation angle.

The second calculation circuit includes an ideal axial force calculation circuit, an estimated axial force calculation circuit, a blending calculation circuit, and a subtractor. The ideal axial force calculation circuit is configured to calculate an ideal axial force based on the target rotation angle. The estimated axial force calculation circuit is configured to calculate, as an estimated axial force, an axial force applied to the steered wheel based on a state variable that reflects vehicle behavior or a road condition. The blending calculation circuit is configured to calculate a final axial force to be reflected in the basic drive torque as a reaction force component for the basic drive torque by summing up a value obtained by multiplying the ideal axial force by a blending ratio and a value obtained by multiplying the estimated axial force by a blending ratio. The blending ratios are set individually based on the state variable that reflects the vehicle behavior or the road condition or based on the steering condition. The subtractor is configured to calculate an axial force deviation, which is a difference between the ideal axial force and the estimated axial force. The second calculation circuit is configured to change the target rotation angle in response to the axial force deviation.

According to this configuration, the axial force deviation between the ideal axial force and the estimated axial force reflects the road condition. For example, when the vehicle is traveling along a low-friction road, the axial force deviation is likely to occur between the ideal axial force and the estimated axial force. The axial force deviation has a larger value as a road grip decreases. According to the configuration described above, the target rotation angle is changed in response to the axial force deviation. The second component of the command value based on the target rotation angle is also based on the axial force deviation, thereby calculating a command value that reflects the road condition more appropriately. Therefore, the motor generates a driving force that reflects the road condition more appropriately. Thus, the driver can acquire a more appropriate steering reaction force in response to the road condition as tactile feedback. Furthermore, the driver can attain a more appropriate steering feel based on the road condition.

BRIEF DESCRIPTION OF THE DRAWINGS

The foregoing and further features and advantages of the invention will become apparent from the following description of example embodiments with reference to the accompanying drawings, wherein like numerals are used to represent like elements and wherein.

DETAILED DESCRIPTION OF EMBODIMENTS

Description is given below of a vehicle control apparatus according to a first embodiment of the present invention, which is applied to a steer-by-wire type steering system.

Figure 1:
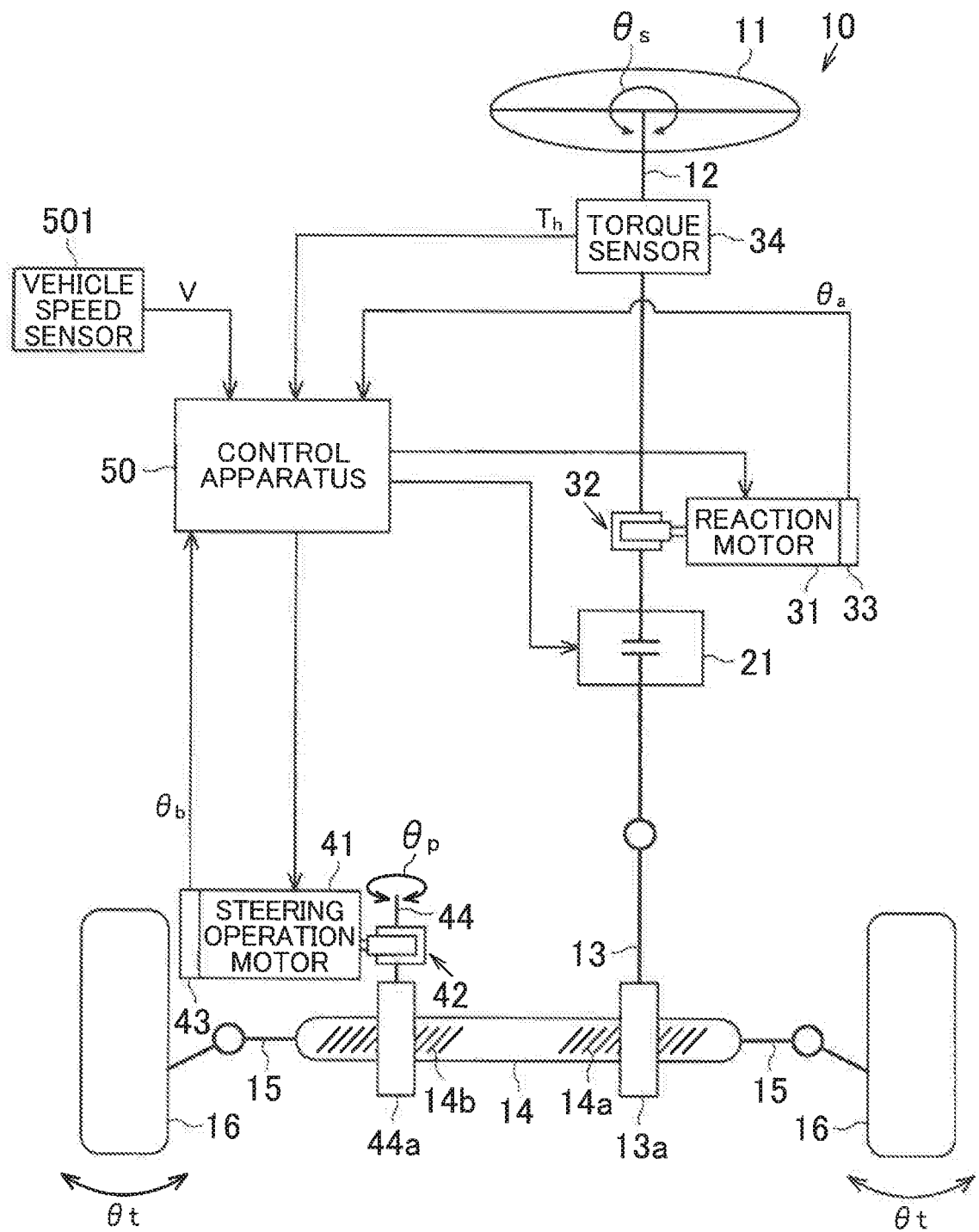
FIG. 1 is a configuration diagram of a steer-by-wire type steering system on which a vehicle control apparatus according to a first embodiment is mounted.

As illustrated in FIG. 1, a steering system 10 for a vehicle includes a steering shaft 12 coupled to a steering wheel 11. A pinion shaft 13 is provided at the end of the steering shaft 12 that is located opposite to the steering wheel 11. Pinion teeth 13a of the pinion shaft 13 mesh with rack teeth 14a of a steering operation shaft 14 extending in a direction that intersects the pinion shaft 13. Right and left steered wheels 16 and 16 are coupled to both ends of the steering operation shaft 14 via tie rods 15 and 15, respectively. The steering shaft 12, the pinion shaft 13, and the steering operation shaft 14 function as a power transmission path between the steering wheel 11 and each of the steered wheels 16 and 16. That is, the steering operation shaft 14 performs linear motion along with a rotational operation of the steering wheel 11, thereby changing a steered angle θt of each of the steered wheels 16 and 16.

The steering system 10 includes a clutch 21. The clutch 21 is provided on the steering shaft 12. An electromagnetic clutch is employed as the clutch 21. The electromagnetic clutch connects and disconnects power through connection and disconnection of electric power for an exciting coil. When the clutch 21 is disengaged, the power transmission path between the steering wheel 11 and each of the steered wheels 16 and 16 is disconnected mechanically. When the clutch 21 is engaged, the power transmission path between the steering wheel 11 and each of the steered wheels 16 and 16 is connected mechanically.

Next, description is given of a reaction unit serving as a structure for generating a steering reaction force. The steering system 10 includes a reaction motor 31, a speed reducing mechanism 32, a rotation angle sensor 33, and a torque sensor 34 as the structure for generating the steering reaction force. The steering reaction force is a three (torque) to be applied in a direction opposite to a direction of a driver's operation of the steering wheel 11. By applying the steering reaction force to the steering wheel 11, the driver can acquire appropriate tactile feedback.

The reaction motor 31 is a source of the steering reaction force. For example, a three-phase (U, V, W) brushless motor is employed as the reaction motor 31. The reaction motor 31 (to be exact, its rotation shaft) is coupled to the steering shaft 12 via the speed reducing mechanism 32. The speed reducing mechanism 32 is provided at a part of the steering shaft 12 that is located on the steering wheel 11 side with respect to the clutch 21. A torque of the reaction motor 31 is applied to the steering shaft 12 as the steering reaction force.

The rotation angle sensor 33 is provided on the reaction motor 31. The rotation angle sensor 33 detects a rotation angle $\theta_a$ of the reaction motor 31. The rotation angle $\theta_a$ of the reaction motor 31 is used for calculating a steering angle $\theta_s$. The reaction motor 31 and the steering shaft 12 operate in association with each other via the speed reducing mechanism 32. Therefore, the rotation angle $\theta_a$ of the reaction motor 31 is correlated to the steering angle $\theta_s$ that is a rotation angle of the steering shaft 12 and furthermore a rotation angle of the steering wheel 11. Thus, the steering angle $\theta_s$ can be determined based on the rotation angle $\theta_a$ of the reaction motor 31.

The torque sensor 34 detects a steering torque $T_h$ applied to the steering shaft 12 through a rotational operation of the steering wheel 11. The torque sensor 34 is provided at a part of the steering shaft 12 that is located on the steering wheel 11 side with respect to the speed reducing mechanism 32.

Next, description is given of a steering operation unit serving as a structure for generating a steering operation force. The steering system 10 includes a steering operation motor 41, a speed reducing mechanism 42, and a rotation angle sensor 43 as the structure for generating the steering operation force that is power for turning the steered wheels 16 and 16.

The steering operation motor 41 is a source of the steering operation force. For example, a three-phase brushless motor is employed as the steering operation motor 41. The steering operation motor 41 (to be exact, its rotation shaft) is coupled to a pinion shaft 44 via the speed reducing mechanism 42. Pinion teeth 44a of the pinion shaft 44 mesh with rack teeth 14b of the steering operation shaft 14. A torque of the steering operation motor 41 is applied to the steering operation shaft 14 via the pinion shaft 44 as the steering operation force. In response to rotation of the steering operation motor 41, the steering operation shaft 14 moves along a vehicle width direction (lateral direction in FIG. 1). The rotation angle sensor 43 is provided on the steering operation motor 41. The rotation angle sensor 43 detects a rotation angle $\theta_b$ of the steering operation motor 41.

The steering system 10 includes a control apparatus 50. The control apparatus 50 controls the reaction motor 31, the steering operation motor 41, and the clutch 21 based on detection results from various sensors. As the sensors, a vehicle speed sensor 501 is provided in addition to the rotation angle sensor 33, the torque sensor 34, and the rotation angle sensor 43 described above. The vehicle speed sensor 501 is provided on the vehicle to detect a vehicle speed V that is a traveling speed of the vehicle.

The control apparatus 50 executes engagement/disengagement control for switching engagement and disengagement of the clutch 21 based on whether a clutch engagement condition is satisfied. Examples of the clutch engagement condition include a condition that a power switch of the vehicle is OFF. When the clutch engagement condition is not satisfied, the control apparatus 50 switches the clutch 21 from an engaged state to a disengaged state by energizing the exciting coil of the clutch 21. When the clutch engagement condition is satisfied, the control apparatus 50 switches the clutch 21 from the disengaged state to the engaged state by stopping the energization of the exciting coil of the clutch 21.

The control apparatus 50 executes reaction control for generating a steering reaction force based on the steering torque $T_h$ through drive control for the reaction motor 31. The control apparatus 50 calculates a target steering reaction force based on at least the steering torque $T_h$ out of the steering torque $T_h$ and the vehicle speed V and calculates a target steering angle of the steering wheel 11 based on the calculated target steering reaction force, the steering torque $T_h$, and the vehicle speed V. The control apparatus 50 calculates a steering angle correction amount through feedback control of the steering angle $\theta_s$, which is executed so that the actual steering angle $\theta_s$ follows the target steering angle, and calculates a steering reaction force command value by adding the calculated steering angle correction amount to the target steering reaction force. The control apparatus 50 supplies, to the reaction motor 31, a current necessary to generate a steering reaction force based on the steering reaction force command value.

The control apparatus 50 executes steering operation control for turning the steered wheels 16 and 16 based on a steering condition through drive control for the steering operation motor 41. The control apparatus 50 calculates a pinion angle $\theta_p$ that is an actual rotation angle of the pinion shaft 44 based on the rotation angle $\theta_b$ of the steering operation motor 41 that is detected through the rotation angle sensor 43. The pinion angle $\theta_p$ is a value that reflects the steered angle θt of each of the steered wheels 16 and 16. The control apparatus 50 calculates a target pinion angle by using the target steering angle described above. Then, the control apparatus 50 determines a deviation between the target pinion angle and the actual pinion angle $\theta_p$, and controls power supply to the steering operation motor 41 so as to eliminate the deviation.

Figure 2:
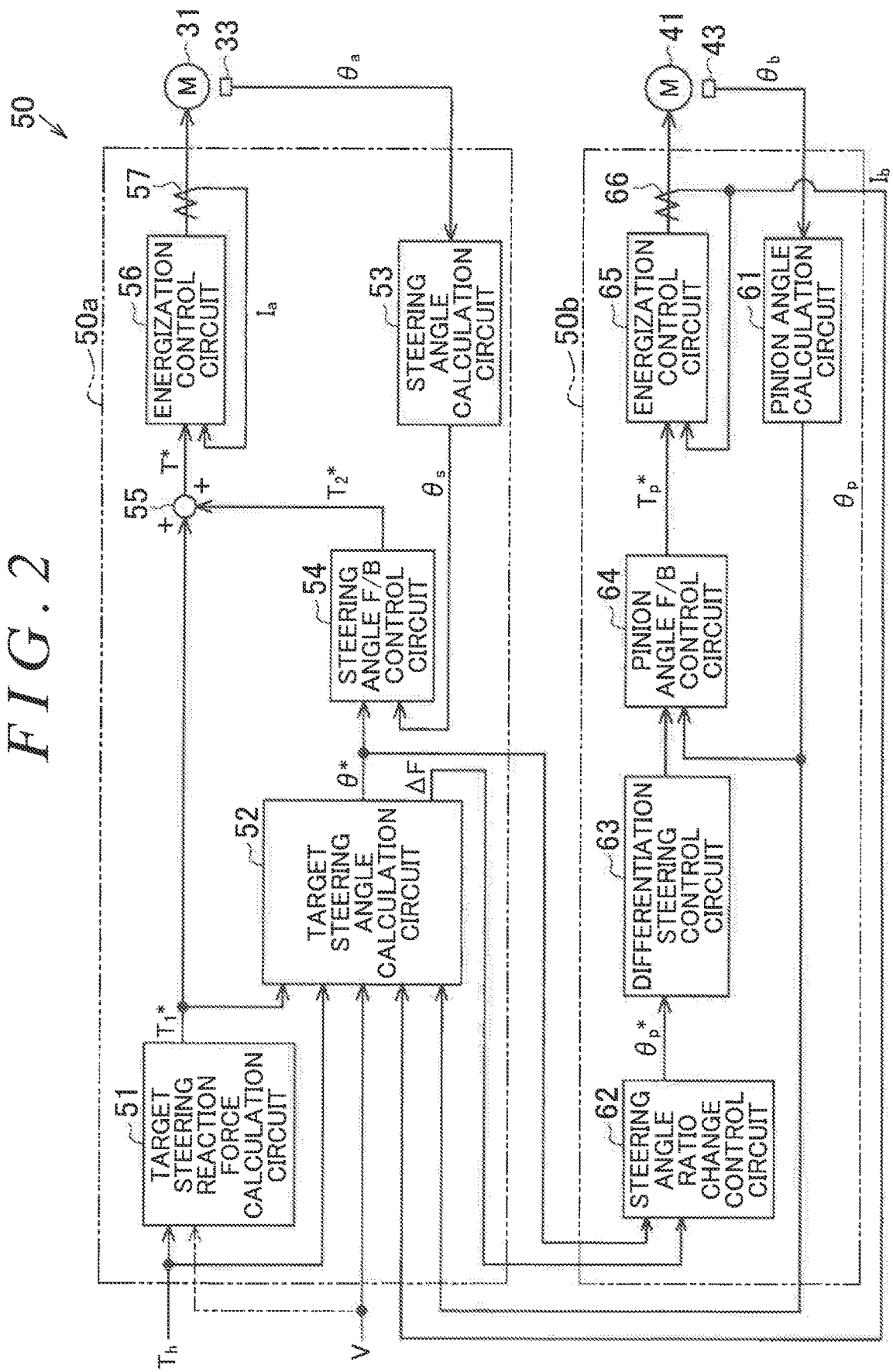
FIG. 2 is a control block diagram of an electronic control apparatus according to the first embodiment.

Next, the configuration of the control apparatus 50 is described in detail. As illustrated in FIG. 2, the control apparatus 50 includes a reaction control circuit 50a configured to execute the reaction control, and a steering operation control circuit 50b configured to execute the steering operation control.

The reaction control circuit 50a includes a target steering reaction force calculation circuit 51, a target steering angle calculation circuit 52, a steering angle calculation circuit 53, a steering angle feedback control circuit 54, an adder 55, and an energization control circuit 56.

The target steering reaction force calculation circuit 51 calculates a target steering reaction force $T_1^*$ based on the steering torque $T_h$. The target steering reaction force calculation circuit 51 may calculate the target steering reaction force $T_1^*$ in consideration of the vehicle speed V.

The target steering angle calculation circuit 52 calculates a target steering angle θ* of the steering wheel 11 based on the target steering reaction force $T_1^*$, the steering torque $T_h$, and the vehicle speed V. The target steering angle calculation circuit 52 has an ideal model that defines an ideal steering angle based on a basic drive torque (input torque), which is the total sum of the target steering reaction force $T_1^*$ and the steering torque $T_h$. The ideal model is obtained by modeling a steering angle corresponding to an ideal steered angle based on the basic drive torque through an experiment or the like in advance. The target steering angle calculation circuit 52 determines the basic drive torque by adding the target steering reaction force $T_1^*$ and the steering torque $T_h$ together, and calculates the target steering angle θ* from the basic drive torque based on the ideal model.

The steering angle calculation circuit 53 calculates the actual steering angle $\theta_s$ of the steering wheel 11 based on the rotation angle $\theta_a$ of the reaction motor 31 that is detected through the rotation angle sensor 33. The steering angle feedback control circuit 54 calculates a steering angle correction amount $T_2^*$ through feedback control of the steering angle $\theta_s$ so that the actual steering angle $\theta_s$ follows the target steering angle θ*. The adder 55 calculates a steering reaction force command value T* by adding the steering angle correction amount $T_2^*$ to the target steering reaction force $T_1^*$.

The energization control circuit 56 supplies electric power to the reaction motor 31 based on the steering reaction force command value T*. Specifically, the energization control circuit 56 calculates a current command value for the reaction motor 31 based on the steering reaction force command value T*. The energization control circuit 56 detects an actual current value $I_a$ generated in a power supply path to the reaction motor 31 through a current sensor 57 provided in the power supply path. The current value $I_a$ is a value of an actual current supplied to the reaction motor 31. Then, the energization control circuit 56 determines a deviation between the current command value and the actual current value $I_a$, and controls power supply to the reaction motor 31 so as to eliminate the deviation (feedback control of the current value $I_a$). Thus, the reaction motor 31 generates a torque based on the steering reaction force command value T*. The driver can acquire appropriate tactile feedback in response to a road reaction force.

As illustrated in FIG. 2, the steering operation control circuit 50b includes a pinion angle calculation circuit 61, a steering angle ratio change control circuit 62, a differentiation steering control circuit 63, a pinion angle feedback control circuit 64, and an energization control circuit 65.

The pinion angle calculation circuit 61 calculates the pinion angle $\theta_p$ that is an actual rotation angle of the pinion shaft 13 based on the rotation angle $\theta_b$ of the steering operation motor 41 that is detected through the rotation angle sensor 43. As described above, the steering operation motor 41 and the pinion shaft 13 operate in association with each other via the speed reducing mechanism 42. Therefore, there is a correlation between the rotation angle $\theta_b$ of the steering operation motor 41 and the pinion angle $\theta_p$. By using the correlation, the pinion angle $\theta_p$ can be determined from the rotation angle $\theta_b$ of the steering operation motor 41. As described above, the pinion shaft 13 meshes with the steering operation shaft 14. Therefore, there is also a correlation between the pinion angle $\theta_p$ and the movement amount of the steering operation shall 14. That is, the pinion angle $\theta_p$ is a value that reflects the steered angle θt of each of the steered wheels 16 and 16.

The steering angle ratio change control circuit 62 sets a steering angle ratio, which is the ratio of the steered angle θt to the steering angle $\theta_s$, based on a traveling condition of the vehicle (for example, the vehicle speed V), and calculates a target pinion angle based on the set steering angle ratio. The steering angle ratio change control circuit 62 calculates a target pinion angle $\theta_p^*$ so that the steered angle θt increases relative to the steering angle $\theta_s$ as the vehicle speed V decreases or that the steered angle θt decreases relative to the steering angle $\theta_s$ as the vehicle speed. V increases. In order to achieve the steering angle ratio to be set based on the traveling condition of the vehicle, the steering angle ratio change control circuit 62 calculates a correction angle for the target steering angle θ*, and adds the calculated correction angle to the target steering angle θ*, thereby calculating the target pinion angle $\theta_p^*$ based on the steering angle ratio.

The differentiation steering control circuit 63 calculates a change speed of the target pinion angle $\theta_p^*$ (steered speed) by differentiating the target pinion angle $\theta_p^*$. The differentiation steering control circuit 63 calculates a correction angle for the target pinion angle $\theta_p^*$ by multiplying the change speed of the target pinion angle $\theta_p^*$ by a gain. The differentiation steering control circuit 63 calculates a final target pinion angle $\theta_p^*$ by adding the correction angle to the target pinion angle $\theta_p^*$. A delay in the steering operation is adjusted by advancing the phase of the target pinion angle $\theta_p^*$ calculated by the steering angle ratio change control circuit 62. That is, a steering operation response is secured based on the steered speed.

The pinion angle feedback control circuit 64 calculates a pinion angle command value $T_p^*$ through feedback control (proportional-integral-derivative (PID) control) of the pinion angle $\theta_p$ so that the actual pinion angle $\theta_p$ follows the final target pinion angle $\theta_p^*$ calculated by the differentiation steering control circuit 63.

The energization control circuit 65 supplies electric power to the steering operation motor 41 based on the pinion angle command value $T_p^*$. Specifically, the energization control circuit 65 calculates a current command value for the steering operation motor 41 based on the pinion angle command value $T_p^*$. The energization control circuit 65 detects an actual current value $I_b$ generated in a power supply path to the steering operation motor 41 through a current sensor 66 provided in the power supply path. The current value $I_b$ is a value of an actual current supplied to the steering operation motor 41. Then, the energization control circuit 65 determines a deviation between the current command value and the actual current value $I_b$, and controls power supply to the steering operation motor 41 so as to eliminate the deviation (feedback control of the current value $I_b$). Thus, the steering operation motor 41 rotates by an angle based on the pinion angle command value $T_p^*$.

Next, the target steering angle calculation circuit 52 is described in detail. As described above, the target steering angle calculation circuit 52 calculates the target steering angle $\theta^*$ based on the ideal model from the basic drive torque, which is the total sum of the target steering reaction force $T_1^*$ and the steering torque $T_h$. The ideal model is a model using the fact that a basic drive torque $T_{in}^*$ that is a torque applied to the steering shaft 12 is represented by Expression (1) below.

$$T_{in}^* = J\theta^{*''} + C\theta^{*'} + K\theta^* \quad (1)$$

In Expression (1), "J" represents a moment of inertia of each of the steering wheel 11 and the steering shaft 12, "C" represents a coefficient of viscosity (coefficient of friction) corresponding to, for example, friction of the steering operation shaft 14 against a housing, and "K" represents a spring modulus assuming the steering wheel 11 and the steering shaft 12 as springs.

As understood from Expression (1), the basic drive torque $T_{in}^*$ is obtained by adding together a value obtained by multiplying a second-order time derivative $\theta^{*''}$ of the target steering angle $\theta^*$ by the moment of inertia J, a value obtained by multiplying a first-order time derivative $\theta^{*'}$ of the target steering angle $\theta^*$ by the coefficient of viscosity C, and a value obtained by multiplying the target steering angle $\theta^*$ by the spring modulus K. The target steering angle calculation circuit 52 calculates the target steering angle $\theta^*$ in accordance with the ideal model based on Expression (1).

Figure 4:
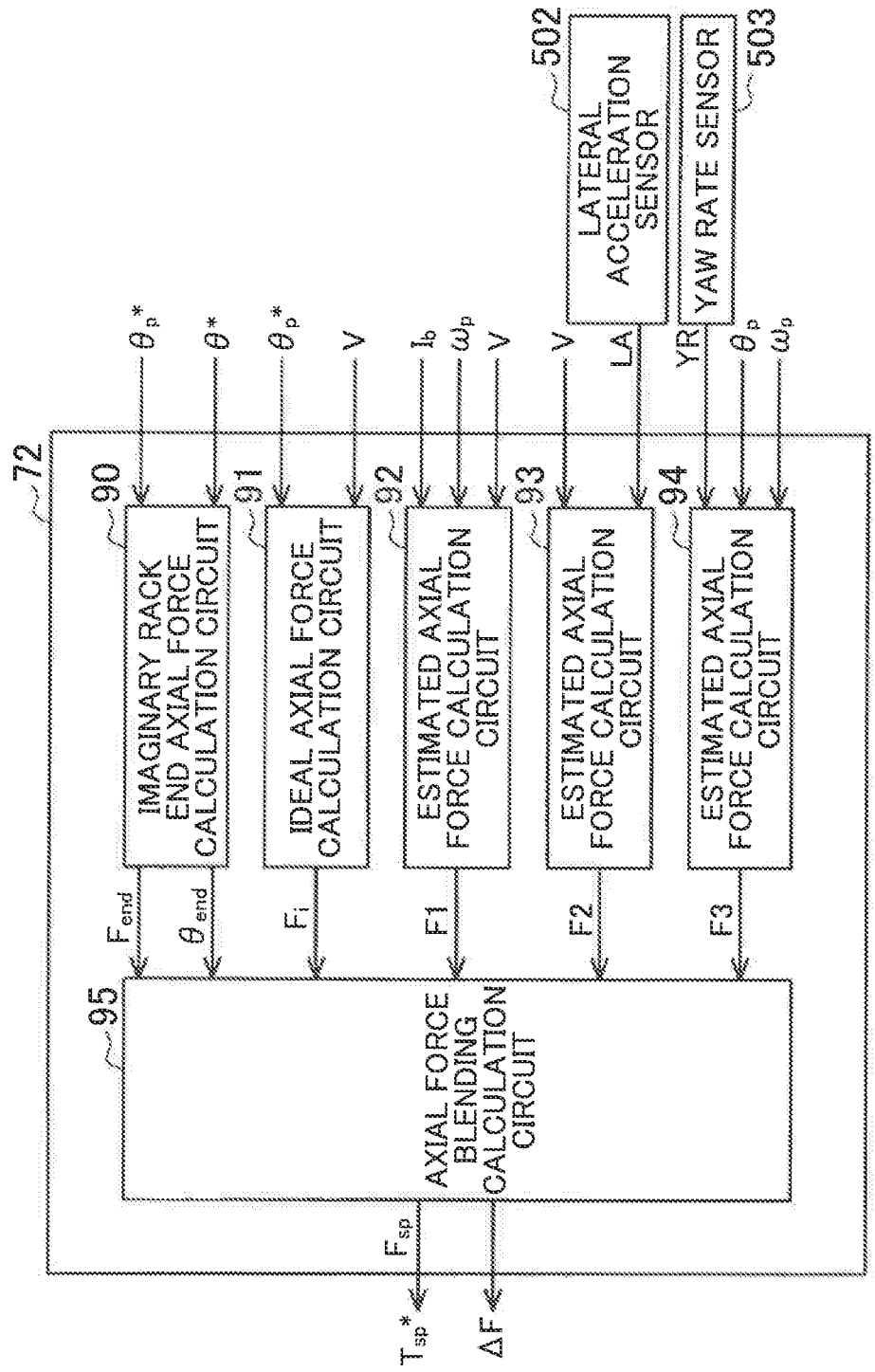
FIG. 4 is a control block diagram of a vehicle model according to the first embodiment.

As illustrated in FIG. 4, the ideal model based on Expression (1) is divided into a steering model 71 and a vehicle model 72. The steering model 71 is tuned based on characteristics of the components of the steering system 10, such as the steering shaft 12 and the reaction motor 31. The steering model 71 includes an adder 73, a subtractor 74, an inertia model 75, a first integrator 76, a second integrator 77, and a viscosity model 78.

The adder 73 calculates the basic drive torque $T_{in}^*$ by adding the target steering reaction force $T_1^*$ and the steering torque $T_h$ together. The subtractor 74 calculates a final basic drive torque $T_{in}^*$ by subtracting a viscosity component $T_{vi}^*$ and a spring component $T_{sp}^*$ described later from the basic drive torque $T_{in}^*$ calculated by the adder 73.

The inertia model 75 functions as an inertia control calculation circuit corresponding to the inertia term of Expression (1). The inertia model 75 calculates a steering angle acceleration $\alpha^*$ by multiplying the final basic drive torque $T_{in}^*$ calculated by the subtractor 74 and the inverse of the moment of inertia J together.

The first integrator 76 calculates a steering angle speed $\omega^*$ by integrating the steering angle acceleration $\alpha^*$ calculated by the inertia model 75. The second integrator 77 calculates the target steering angle $\theta^*$ by integrating the steering angle speed $\omega^*$ calculated by the first integrator 76. The target steering angle $\theta^*$ is an ideal rotation angle of the steering wheel 11 (steering shaft 12) based on the steering model 71.

The viscosity model 78 functions as a viscosity control calculation circuit corresponding to the viscosity term of Expression (1). The viscosity model 78 calculates the viscosity component $T_{vi}^*$ of the basic drive torque $T_{in}^*$ by multiplying the steering angle speed calculated by the first integrator 76 and the coefficient of viscosity C together.

The vehicle model 72 is tuned based on characteristics of the vehicle on which the steering system 10 is mounted. A vehicle-side characteristic that influences the steering characteristic is determined based on, for example, specifications of a suspension and wheel alignment and a grip force (friction force) of each of the steered wheels 16 and 16. The vehicle model 72 functions as a spring characteristic control calculation circuit corresponding to the spring term of Expression (1). The vehicle model 72 calculates the spring component $T_{sp}^*$ (spring reaction torque) of the basic drive torque $T_{in}^*$ by multiplying the target steering angle $\theta^*$ calculated by the second integrator 77 and the spring modulus K together.

When the vehicle model 72 calculates the spring component $T_{sp}^*$, the vehicle speed V and the current value $I_b$ of the steering operation motor 41 that is detected through the current sensor 66 are taken into consideration. The vehicle model 72 acquires a pinion angle speed $\omega_p$. The pinion angle speed $\omega_p$ is obtained such that the pinion angle $\theta_p$ calculated by the pinion angle calculation circuit 61 is differentiated by a differentiator 79 provided in the control apparatus 50. The pinion shaft 13 meshes with the steering operation shaft 14. Therefore, there is a correlation between a change speed of the pinion angle $\theta_p$ (pinion angle speed $\omega_p$) and a moving speed of the steering operation shaft 14 (steered speed). That is, the pinion angle speed $\omega_p$ is a value that reflects the steered speed of each of the steered wheels 16 and 16. The steered speed may be determined from the pinion angle speed $\omega_p$ by using the correlation between the pinion angle speed $\omega_p$ and the steered speed.

According to the target steering angle calculation circuit 52 having the configuration described above, the relationship between the basic drive torque $T_{in}^*$ and the target steering angle $\theta^*$ can be tuned directly and furthermore a desired steering characteristic can be achieved by adjusting the moment of inertia J and the coefficient of viscosity C of the steering model 71 and the spring modulus K of the vehicle model 72.

The target pinion angle $\theta_p{}^*$ is calculated by using the target steering angle $\theta^*$ calculated from the basic drive torque $T_{in}{}^*$ based on the steering model 71 and the vehicle model 72. Then, feedback control is performed so that the actual pinion angle $\theta_p$ equals the target pinion angle $\theta_p{}^*$. As described above, there is a correlation between the pinion angle $\theta_p$ and the steered angle θt of each of the steered wheels 16 and 16. Therefore, the turning operation of each of the steered wheels 16 and 16 based on the basic drive torque $T_{in}{}^*$ is also determined by the steering model 71 and the vehicle model 72. That is, the steering feel of the vehicle is determined by the steering model 71 and the vehicle model 72. Thus, a desired steering feel can be achieved by adjusting the steering model 71 and the vehicle model 72.

The steering reaction force (tactile feedback to be acquired through a steering operation), which is a force (torque) to be applied in a direction opposite to the driver's steering direction, is only based on the target steering angle $\theta^*$. That is, the steering reaction force does not change in response to a road condition (for example, the possibility of a slip that may occur on a road). Therefore, it is difficult for the driver to grasp the road condition through the steering reaction force. In this example, the vehicle model 72 has the following configuration from the viewpoint of addressing such concerns.

Figure 5:
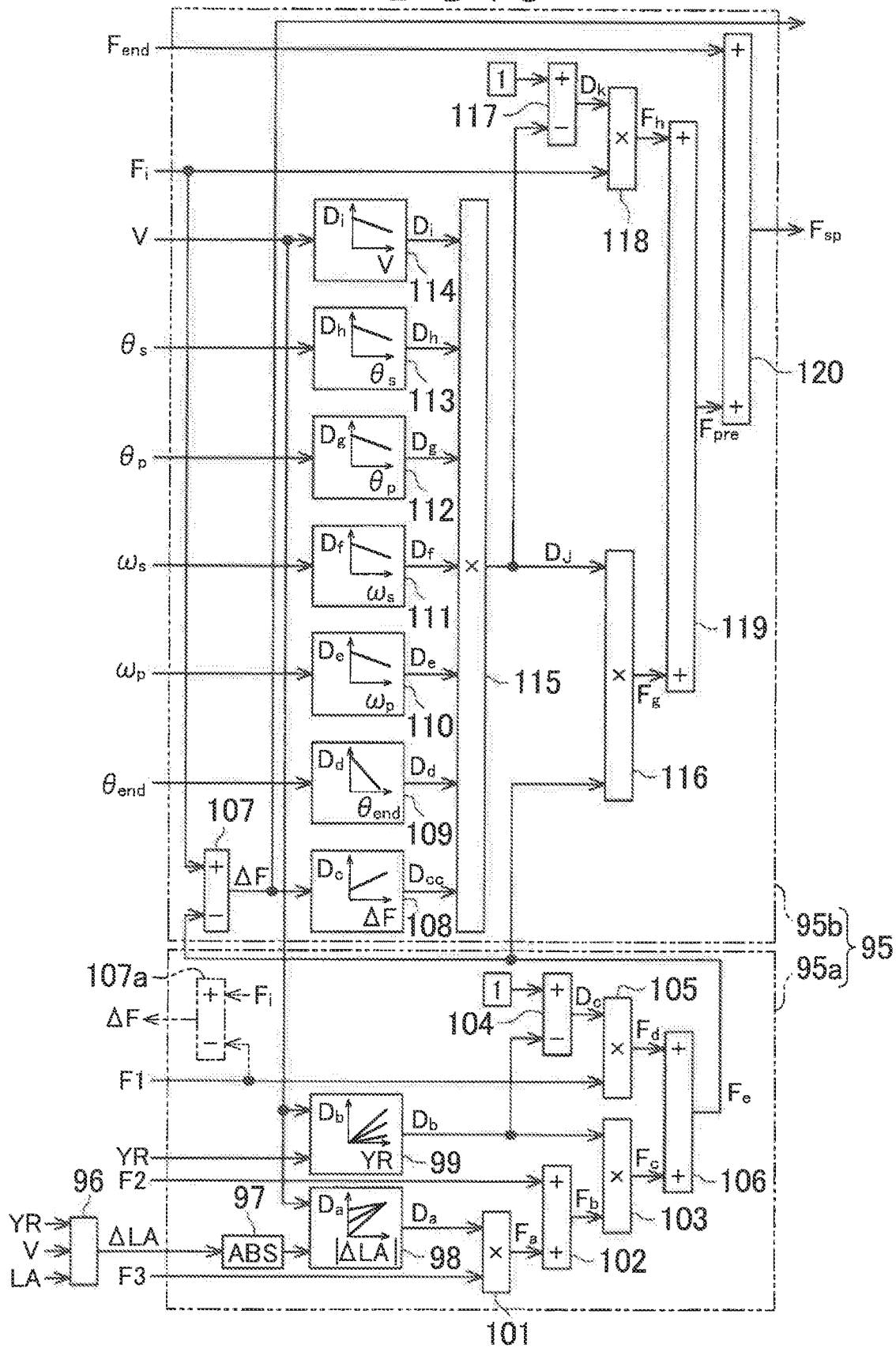
FIG. 5 is a control block diagram of an axial force blending calculation circuit according to the first embodiment.

As illustrated in FIG. 5, the vehicle model 72 includes an imaginary rack end axial force calculation circuit 90, an ideal axial force calculation circuit 91, an estimated axial force calculation circuit 92, an estimated axial force calculation circuit 93, an estimated axial force calculation circuit 94, and an axial force blending calculation circuit 95.

When the operation position of the steering wheel 11 is close to a limit position of a physical operation range, the imaginary rack end axial force calculation circuit 90 calculates an imaginary rack end axial force $F_{end}$ as a correction amount for the basic drive torque $T_{in}{}^*$ in order to imaginarily limit the operation range of the steering wheel 11 to a range narrower than an original maximum physical steering range. The imaginary rack end axial force $F_{end}$ is calculated from the viewpoint of sharply increasing a torque (steering reaction torque) to be generated in the reaction motor 31 in a direction opposite to the steering direction.

The limit position of the physical operation range of the steering wheel 11 is also a position at which the steering operation shaft 14 reaches the limit of its movable range. When the steering operation shaft 14 reaches the limit of its movable range, there occurs a so-called "end abutment", in which the end of the steering operation shaft 14 (rack end) abuts against the housing. Therefore, the movement range of the rack shaft is physically limited. Thus, the operation range of the steering wheel is also limited.

The imaginary rack end axial force calculation circuit 90 acquires the target steering angle $\theta^*$ and the target pinion angle $\theta_p{}^*$ calculated by the steering angle ratio change control circuit 62 (see FIG. 2). The imaginary rack end axial force calculation circuit 90 calculates a target steered angle by multiplying the target pinion angle $\theta_p{}^*$ by a predetermined conversion coefficient. The imaginary rack end axial force calculation circuit 90 compares the target steered angle with the target steering angle $\theta^*$, and uses, as an imaginary rack end angle $\theta_{end}$, one of the target steered angle and the target steering angle $\theta^*$ that is larger in the absolute value.

When the imaginary rack end angle $\theta_{end}$ reaches an end determination threshold, the imaginary rack end axial force calculation circuit 90 calculates the imaginary rack end axial force $F_{end}$ by using an imaginary rack end map stored in a storage apparatus (not illustrated) of the control apparatus 50. The end determination threshold is set based on a value in the vicinity of the maximum physical steering range of the steering wheel 11 or a value in the vicinity of the maximum movable range of the steering operation shaft 14. The imaginary rack end axial force $F_{end}$ is a correction amount for the basic drive torque $T_{in}{}^*$, and is set to have the same sign as the sign (positive or negative) of the imaginary rack end angle $\theta_{end}$. After the imaginary rack end angle $\theta_{end}$ reaches the end determination threshold, the imaginary rack end axial force $F_{end}$ is set to a larger value as the absolute value of the imaginary rack end angle $\theta_{end}$ increases.

The ideal axial force calculation circuit 91 calculates an ideal axial force which is an ideal value of the axial three to be applied to the steering operation shaft 14 through the steered wheels 16 and 16. The ideal axial force calculation circuit 91 calculates the ideal axial three $F_i$ by using an ideal axial force map stored in the storage apparatus (not illustrated) of the control apparatus 50. The ideal axial force $F_i$ is set to have a larger absolute value as the absolute value of the target steered angle obtained by multiplying the target pinion angle $\theta_p{}^*$ by the predetermined conversion coefficient increases and as the vehicle speed V decreases. The ideal axial force $F_i$ may be calculated based on the target steered angle alone without considering the vehicle speed V.

The estimated axial force calculation circuit 92 calculates an actual axial force F1 (road reaction force) to be applied to the steering operation shaft 14 (steered wheels 16 and 16) based on the current value $I_b$ of the steering operation motor 41. The current value $I_b$ of the steering operation motor 41 changes in response to the occurrence of a difference between the target pinion angle $\theta_p{}^*$ and the actual pinion angle $\theta_p$ due to a situation in which a disturbance caused by a road condition (road frictional resistance) affects the steered wheels 16. That is, the current value $I_b$ of the steering operation motor 41 reflects an actual road reaction force applied to the steered wheels 16 and 16. Therefore, an axial force that reflects an influence of the road condition can be calculated based on the current value $I_b$ of the steering operation motor 41. The axial force F1 is determined by multiplying the current value $I_b$ of the steering operation motor 41 by a gain that is a coefficient for converting a current value into an axial force (reaction torque).

The estimated axial force calculation circuit 93 estimates and calculates an axial three F2 to be applied to the steering operation shaft 14 based on a lateral acceleration LA detected through a lateral acceleration sensor 502 provided in the vehicle. The axial three F2 is determined by multiplying the lateral acceleration LA by a gain that is a coefficient based on the vehicle speed V. The lateral acceleration LA reflects a road condition such as a road frictional resistance. Therefore, the axial force F2 calculated based on the lateral acceleration LA reflects an actual road condition.

The estimated axial force calculation circuit 94 estimates and calculates an axial force F3 to be applied to the steering operation shaft 14 based on a yaw rate YR detected through a yaw rate sensor 503 provided in the vehicle. The axial force F3 is determined by multiplying together a yaw rate derivative that is a value obtained by differentiating the yaw rate YR and a vehicle speed gain that is a coefficient based on the vehicle speed V. The vehicle speed gain is set to a larger value as the vehicle speed V increases. The yaw rate YR reflects a road condition such as a road frictional resistance. Therefore, the axial force F3 calculated based on the yaw rate YR reflects an actual road condition.

The axial force F3 may be calculated as follows. That is, the estimated axial force calculation circuit 94 determines the axial force F3 by adding at least one of a correction axial force based on the steered angle θt, a correction axial force based on the steered speed, and a correction axial force based on a steered angle acceleration to a value obtained by multiplying the yaw rate derivative by the vehicle speed gain. The steered angle θt is obtained by multiplying the pinion angle $θ_p$ by a predetermined conversion coefficient. The steered speed may be obtained by differentiating the steered angle θt or by converting the pinion angle speed $ω_p$. The steered angle acceleration may be obtained by differentiating the steered speed or by converting a pinion angle acceleration $α_p$.

The axial force blending calculation circuit 95 calculates a final axial force $F_{sp}$ by summing up the imaginary rack end axial force $F_{end}$, the ideal axial force the axial force F1, the axial force F2, and the axial force F3 at predetermined blending ratios based on various state variable s that reflect a traveling condition or a steering condition of the vehicle. The final axial force $F_{sp}$ is used for calculating the spring component $T_{sp}^*$ for the basic drive torque $T_{in}^*$. The vehicle model 72 calculates (converts) the spring component $T_{sp}^*$ for the basic drive torque $T_{in}^*$ based on the axial force $F_{sp}$.

Next, the axial force blending calculation circuit 95 is described in detail.

Figure 6:
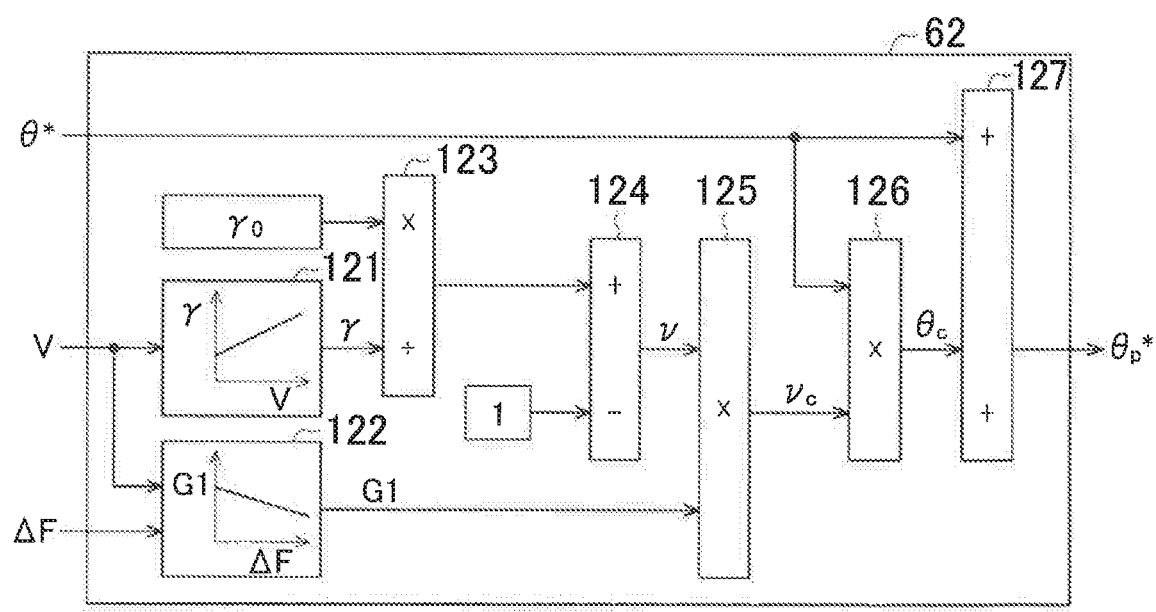
FIG. 6 is a control block diagram of a steering angle ratio change control circuit according to the first embodiment.

As illustrated in FIG. 6, the axial force blending calculation circuit 95 includes a first calculation circuit 95a and a second calculation circuit 95b.

The first calculation circuit 95a calculates a more appropriate estimated axial force $F_c$ by summing up, at predetermined blending ratios, the axial forces F1, F2, and F3 estimated and calculated by the estimated axial force calculation circuits 92, 93, and 94, respectively.

The first calculation circuit 95a acquires the axial forces F1, F2, and F3, the yaw rate YR, and a lateral acceleration difference ΔLA. The lateral acceleration difference ΔLA is calculated by a difference calculation circuit 96 provided in the vehicle model 72. The difference calculation circuit 96 calculates the lateral acceleration difference ΔLA based on Expression (2) below.

$$ΔLA = YR × V - LA \quad (2)$$

In Expression (2), "YR" represents a yaw rate detected through the yaw rate sensor 503, "V" represents a vehicle speed detected through the vehicle speed sensor 501, and "LA" represents a lateral acceleration detected through the lateral acceleration sensor 502.

The first calculation circuit 95a includes an absolute value calculation circuit 97, blending ratio calculation circuits 98 and 99, multipliers 101, 103, and 105, adders 102 and 106, and a subtractor 104. The absolute value calculation circuit 97 calculates an absolute value |ΔLA| of the lateral acceleration difference ΔLA calculated by the difference calculation circuit 96. The blending ratio calculation circuit 98 calculates a blending ratio $D_a$ based on the absolute value |ΔLA| of the lateral acceleration difference ΔLA. The blending ratio $D_a$ is set to a larger value as the absolute value |ΔLA| of the lateral acceleration difference ΔLA increases and as the vehicle speed V increases. The multiplier 101 calculates an axial force $F_a$ after blending by multiplying the axial force F3 based on the yaw rate YR and the blending ratio $D_a$ together. The adder 102 calculates an axial force $F_b$ by adding the axial force F2 based on the lateral acceleration LA and the axial force $F_a$ calculated by the multiplier 101 together.

The blending ratio calculation circuit 99 calculates a blending ratio $D_b$ based on the yaw rate YR. The blending ratio $D_b$ is set to a larger value as the yaw rate YR increases and as the vehicle speed V increases. The multiplier 103 calculates an axial force $F_c$ by multiplying the axial force $F_b$ calculated by the adder 102 and the blending ratio $D_b$ together.

The subtractor 104 calculates a blending ratio $D_c$ by subtracting the blending ratio $D_b$ calculated by the blending ratio calculation circuit 99 from "1", which is a fixed value stored in the storage apparatus of the control apparatus 50. The multiplier 105 calculates an axial force $F_d$ by multiplying the axial force F1 based on the current value $I_b$ of the steering operation motor 41 and the blending ratio $D_c$ together.

The adder 106 calculates the final estimated axial force $F_e$ by adding the axial force $F_d$ calculated by the multiplier 105 and the axial force $F_e$ calculated by the multiplier 103 together. The second calculation circuit 95b calculates the final axial force $F_{sp}$, which is used for calculating the spring component $T_{sp}^*$ for the basic drive torque $T_{in}^*$, by summing up the estimated axial force $F_e$ calculated by the first calculation circuit 95a and the ideal axial force $F_i$ calculated by the ideal axial force calculation circuit 91 at predetermined blending ratios based on various state variable s that reflect a traveling condition or a steering condition of the vehicle.

The second calculation circuit 95b includes subtractors 107 and 117, blending ratio calculation circuits 108 to 114, multipliers 115, 116, and 118, and adders 119 and 120. The subtractor 107 calculates an axial force deviation ΔF by subtracting the estimated axial force $F_e$ calculated in a blended manner by the first calculation circuit 95a (adder 106) from the ideal axial force $F_i$ based on the target pinion angle $θ_p^*$.

The blending ratio calculation circuit 108 calculates a blending ratio $D_c$ based on the axial force deviation ΔF. The blending ratio $D_c$ is set to a larger value as the axial force deviation ΔF increases. The blending ratio calculation circuit 109 calculates a blending ratio $D_d$ based on the imaginary rack end angle $θ_{end}$. The blending ratio calculation circuit 110 calculates a blending ratio $D_e$ based on the pinion angle speed $ω_p$ (may be converted into the steered speed). The blending ratio calculation circuit 111 calculates a blending ratio $D_f$ based on the steering speed $ω_s$ obtained by differentiating the steering angle $θ_s$. The blending ratio calculation circuit 112 calculates a blending ratio $D_g$ based on the pinion angle $θ_p$. The blending ratio calculation circuit 113 calculates a blending ratio $D_h$ based on the steering angle $θ_s$. The blending ratio calculation circuit 114 calculates a blending ratio $D_i$ based on the vehicle speed V. The blending ratios $D_d$, $D_e$, $D_f$, $D_h$, and $D_i$ are set to smaller values as the state variable s ($θ_{end}$, $ω_p$, $ω_s$, $θ_p$, $θ_s$, V) acquired by the respective blending ratio calculation circuits (109 to 114) increase.

The multiplier 115 calculates a blending ratio $D_j$ of the final estimated axial force $F_e$ calculated by the first calculation circuit 95a by multiplying the blending ratios Dcc, $D_d$, $D_e$, $D_f$, $D_g$, $D_h$, and $D_i$ together. The multiplier 116 calculates an estimated axial force $F_g$ after blending by multiplying the final estimated axial force $F_e$ calculated by the first calculation circuit 95a and the blending ratio $D_j$ based on the state variable s together.

The subtractor 117 calculates a blending ratio $D_k$ of the ideal axial force $F_i$ by subtracting the blending ratio $D_j$ calculated by the multiplier 115 from "1", which is a fixed value stored in the storage apparatus of the control apparatus

50. The multiplier 118 calculates an ideal axial force $F_h$ after blending by multiplying the ideal axial force $F_i$ calculated by the ideal axial force calculation circuit 91 and the blending ratio $D_k$ together.

The adder 119 calculates an axial force $F_{pre}$ by summing up the ideal axial force $F_h$ after blending and the estimated axial force $F_g$ after blending. The adder 120 calculates the final axial force $F_{sp}$, which is used for calculating the spring component $T_{sp}^*$ for the basic drive torque $T_{in}^*$, by summing up the axial force $F_{pre}$ calculated by the adder 119 and the imaginary rack end axial force $F_{end}$. When the imaginary rack end axial force $F_{end}$ is not calculated, the axial force $F_{pre}$ calculated by the adder 119 is used as the final axial force $F_{sp}$, which is used for calculating the spring component $T_{sp}^*$ for the basic drive torque $T_{in}^*$.

According to this example, the axial forces F1, F2, and F3 estimated and calculated based on the plurality of types of state variable s that reflect vehicle behavior or a road condition and the ideal axial force $F_i$ calculated based on the target pinion angle $\theta_p^*$ (target steered angle) are summed up at the blending ratios set based on the plurality of types of state variable s that reflect the vehicle behavior, the steering condition, or the road condition. Thus, the axial force $F_{pre}$ ($F_{sp}$) that reflects the road condition more finely is calculated. When the axial force $F_{pre}$ is reflected in the basic drive torque $T_{in}^*$, a finer steering reaction force in response to the road condition is applied to the steering wheel 11.

Depending on product specifications or the like, there is a demand to further improve the controllability (operability) or the steering feel of the steering wheel 11. For example, there is a demand to change the operability or the steering feel in response to the road condition. In this example, the steering angle ratio change control circuit 62 has the following configuration.

As illustrated in FIG. 6, the steering angle ratio change control circuit 62 includes a steering angle ratio calculation circuit 121, a gain calculation circuit 122, a calculator 123, a subtractor 124, two multipliers 125 and 126, and an adder 127.

The steering angle ratio calculation circuit 121 calculates a steering angle ratio ♥ (overall steering gear ratio) by using a map that defines a relationship between the vehicle speed V and the steering angle ratio γ. The steering angle ratio γ is the ratio of the steered angle θt to the steering angle $\theta_s$. The steering angle ratio γ is set to a larger value as the vehicle speed V increases. As the steering angle ratio γ decreases, the steered angle θt of each of the steered wheels 16 and 16 increases and a quick response is given when the steering wheel 11 is operated. As the steering angle ratio γ increases, the steered angle θt of each of the steered wheels 16 and 16 decreases and a slow response is given when the steering wheel 11 is operated.

The gain calculation circuit 122 calculates a gain 31 by using a map that defines a relationship between the axial force deviation ΔF and the gain G1. The gain G1 is set to a smaller value as the axial force deviation ΔF increases.

The calculator 123 divides a base gear ratio $\gamma_0$, which is a fixed value stored in the storage apparatus of the control apparatus 50, by the steering angle ratio γ calculated by the steering angle ratio calculation circuit 121. The base gear ratio $\gamma_0$ is a gear ratio determined mechanically from the number of the rack teeth 14b of the steering operation shaft 14 and the number of the pinion teeth 44a of the pinion shaft 44.

The subtractor 124 calculates a speed increasing ratio ν by subtracting "1", which is a fixed value stored in the storage apparatus of the control apparatus 50, from a division result obtained by the calculator 123. When the steering angle ratio γ is smaller than the base gear ratio $\gamma_0$ (quick), the speed increasing ratio ν has a positive value. When the steering angle ratio γ is larger than the base gear ratio $\gamma_0$ (slow), the speed increasing ratio ν has a negative value.

The multiplier 125 calculates a corrected speed increasing ratio $\nu_c$ by multiplying the speed increasing ratio ν calculated by the subtractor 124 and the gain G1 calculated by the gain calculation circuit 122 together. The corrected speed increasing ratio $\nu_c$ has a smaller value as the axial force deviation ΔF increases. This is because the gain G1 is set to a smaller value as the axial force deviation ΔF increases.

The multiplier 126 calculates a correction angle $\theta_c$ (first correction angle) for the target steering angle θ* by multiplying the target steering angle θ* calculated by the target steering angle calculation circuit 52 and the corrected speed increasing ratio $\nu_c$ together.

The adder 127 calculates the target pinion angle $\theta_p^*$ by adding the target steering angle θ* and the correction angle $\theta_c$ together. Next, actions and effects of the steering angle ratio change control circuit 62 are described.

For example, when the vehicle is traveling along a low-friction road such as a wet road or a snowy road, the axial force deviation ΔF is likely to occur between the ideal axial force $F_i$ and the estimated axial force $F_e$. The reason is as follows. That is, the ideal axial force $F_i$ is calculated based on the target pinion angle $\theta_p^*$. Therefore, the ideal axial force $F_i$ is not likely to reflect the road condition. The estimated axial force $F_e$ is calculated based on various state variable s. Therefore, the estimated axial force $F_e$ is likely to reflect the road condition. Thus, the ideal axial force. $F_i$ only has a value based on the target pinion angle $\theta_p^*$ irrespective of the tire grip condition, whereas the estimated axial force $F_e$ decreases as the road grip decreases. Accordingly, the difference between the ideal axial force $F_i$ and the estimated axial force $F_e$ increases as the road grip decreases. For this reason, the axial force deviation ΔF reflects the road condition.

According to this example, the speed increasing ratio ν is changed in response to the axial force deviation ΔF between the ideal axial force $F_i$ and the estimated axial force $F_e$, whereby the corrected speed increasing ratio $\nu_c$ has a more appropriate value based on the road condition. Thus, a target pinion angle $\theta_p^*$ that reflects the road condition more appropriately is calculated. For example, when the vehicle is traveling along a low-friction road, the steering wheel 11 is more difficult to operate as the speed increasing ratio ν is set closer to the quick side (larger value). According to this example, for example, the gain G1 is set to a smaller value as the axial force deviation ΔF increases along with a decrease in the road grip of the tire. Therefore, the corrected speed increasing ratio $\nu_e$ has a smaller value. That is, the corrected speed increasing ratio $\nu_c$ is set closer to the slow side (smaller value) depending on the degree of the increase in the axial force deviation ΔF. Thus, the operability of the steering wheel 11 is improved. The configuration of this example is particularly suitable when the characteristic of the map that is used in the steering angle ratio calculation circuit 121 is set closer to the quick side as a whole.

The first embodiment may be modified as follows.

In this example, the steering angle ratio γ is calculated based on the vehicle speed V, and the calculated steering angle ratio γ is converted into the speed increasing ratio ν, but the following configuration may be employed. That is, the steering angle ratio change control circuit 62 has a configuration in which the calculator 123 and the subtractor 124 are omitted. In this configuration, the steering angle ratio calculation circuit 121 calculates the speed increasing ratio ν by using a map that defines a relationship between the vehicle speed V and the speed increasing ratio ν. The multiplier 125 calculates the corrected speed increasing ratio $ν_c$ by multiplying the speed increasing ratio ν calculated by the steering angle ratio calculation circuit 121 and the axial force deviation ΔF together.

In this example, the speed increasing ratio ν is multiplied by the gain G1 based on the axial force deviation ΔF, but the steering angle ratio γ calculated by the steering angle ratio calculation circuit 121 may be multiplied by the gain G1. Also in this case, the corrected speed increasing ratio $ν_c$ reflects the road condition.

Depending on product specifications or the like, the increase/decrease characteristic of the map that is used in the gain calculation circuit 122 may be reversed. That is, the gain G1 is set to a larger value as the axial force deviation ΔF increases. For example, when the road grip of the tire decreases, some experienced drivers feel it easier to correct the posture of the vehicle on a quicker side than on the slow side.

Next, a vehicle control apparatus according to a second embodiment is described.

Depending on product specifications or the like, there is a demand to further improve the steering feel in a tire grip limit range when the vehicle is traveling along a low-friction road or the like. In this example, the steering model 71 has the following configuration.

Figure 7:
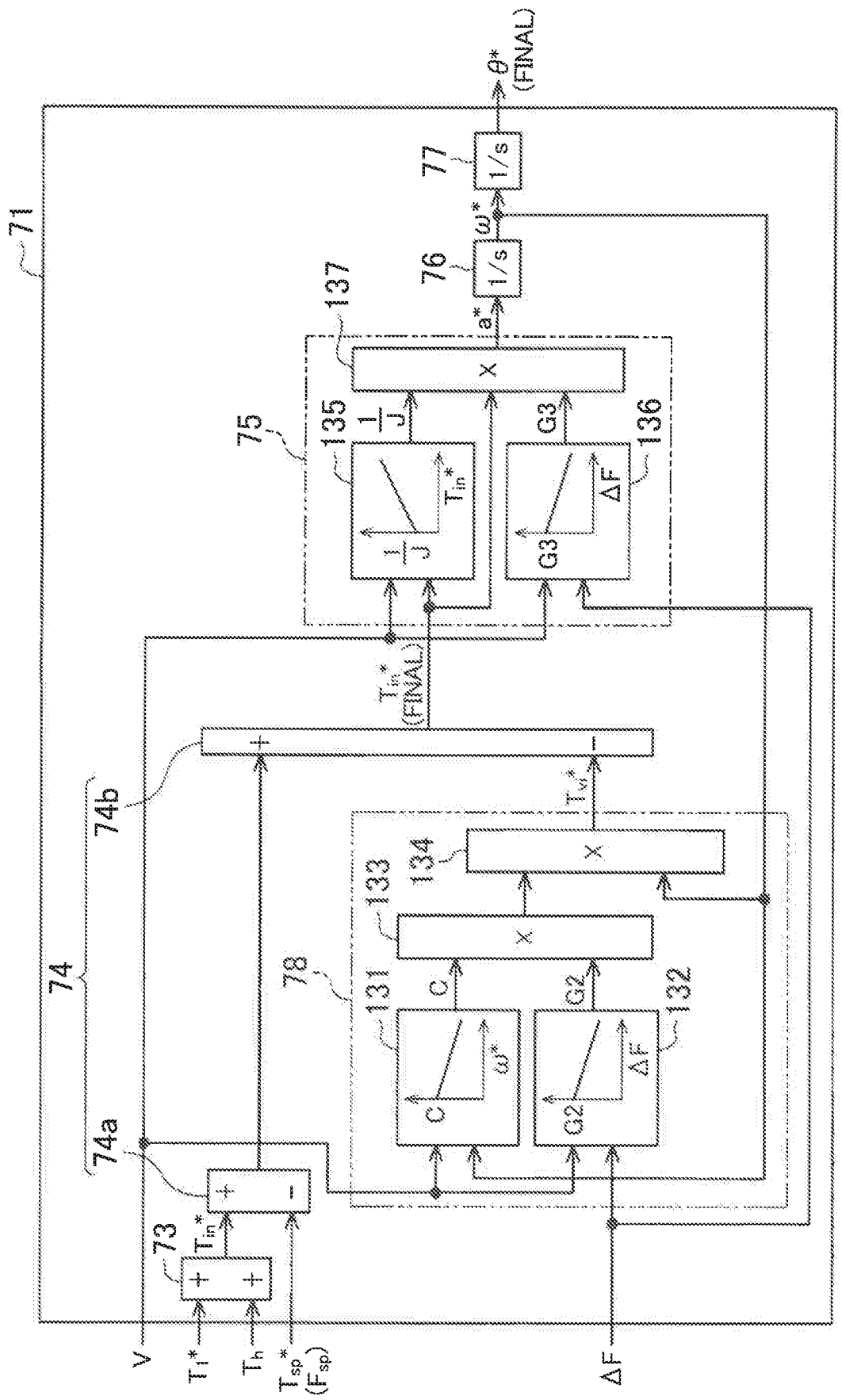
FIG. 7 is a control block diagram of a steering model according to a second embodiment.

As illustrated in FIG. 7 and as described above, the steering model 71 includes the adder 73, the subtractor 74, the inertia model 75, the first integrator 76, the second integrator 77, and the viscosity model 78. The subtractor 74 includes a subtractor 74a and a subtractor 74b. The subtractor 74a subtracts the spring component $T_{sp}$* calculated by the vehicle model 72 from the basic drive torque $T_{in}$* calculated by the adder 73.

The viscosity model 78 includes a viscosity calculation circuit 131, a gain calculation circuit 132, and two multipliers 133 and 134. The viscosity calculation circuit 131 calculates the coefficient of viscosity (viscosity term) C by using a map that defines a relationship between the steering angle speed ω* calculated by the first integrator 76 and the coefficient of viscosity C depending on the vehicle speed V. The coefficient of viscosity C is set to a smaller value as the steering angle speed ω* increases.

The gain calculation circuit 132 calculates a gain G2 by using a map that defines a relationship between the axial three deviation ΔF and the gain G2. The gain G2 is set to a smaller value as the axial force deviation ΔF increases.

The multiplier 133 multiplies the coefficient of viscosity C calculated by the viscosity calculation circuit 131 and the gain G2 calculated by the gain calculation circuit 132 together. That is, the coefficient of viscosity C is changed in response to the axial force deviation ΔF (road condition). The multiplier 134 calculates the viscosity component. $T_{vi}$* by multiplying the coefficient of viscosity C multiplied by the gain G2 and the steering angle speed ω* calculated by the first integrator 76 together.

The subtractor 74b calculates the final basic drive torque $T_{in}$* by subtracting the viscosity component $T_{vi}$* calculated by the multiplier 134 from the basic drive torque $T_{in}$* from which the spring component $T_{sp}$* is subtracted by the subtractor 74a.

The inertia model 75 includes an inertia calculation circuit 135, a gain calculation circuit 136, and a multiplier 137. The inertia calculation circuit 135 calculates an inverse 1/J of the moment of inertia (inertia term) J by using a map that defines a relationship between the final basic drive torque $T_{in}$* and the inverse 1/J of the moment of inertia J depending on the vehicle speed V.

The gain calculation circuit 136 calculates a gain G3 by using a map that defines a relationship between the axial force deviation ΔF and the gain G3 depending on the vehicle speed V. The gain G3 is set to a smaller value as the axial force deviation ΔF increases.

The multiplier 137 calculates the steering angle acceleration α* by multiplying together the final basic drive torque $T_{in}$* calculated by the subtractor 74b, the inverse 1/J of the moment of inertia J that is calculated by the inertia calculation circuit 135, and the gain G3 calculated by the gain calculation circuit 136. The gain G3 based on the axial force deviation ΔF reflects the road condition. Therefore, the steering angle acceleration α* has a more appropriate value based on the axial force deviation ΔF (road condition).

The first integrator 76 calculates the steering angle speed u by integrating the steering angle acceleration α* calculated by the multiplier 137. The second integrator 77 calculates the target steering angle θ* by integrating the steering angle speed ω* calculated by the first integrator 76.

According to this example, the coefficient of viscosity C and the inverse 1/J of the moment of inertia J are changed in response to the axial force deviation ΔF between the ideal axial force $F_i$ and the estimated axial force $F_e$, thereby attaining a more appropriate steering feel (sense of viscosity and sense of inertia) based on the road condition.

For example, the axial force deviation ΔF increases as the road grip of the tire decreases. Along with the increase, the coefficient of viscosity C is set to a smaller value. Therefore, the sense of viscosity of the steering wheel 11 decreases. Thus, it is possible to attain a so-called "smooth" steering feel with a smaller sense of viscosity. Since the axial force deviation ΔF increases as the road grip of the tire decreases, the inverse 1/J of the moment of inertia J is set to a smaller value along with the increase. Therefore, the sense of inertia of the steering wheel 11 decreases.

The second embodiment may be modified as follows. Depending on product specifications or the like, the increase/decrease characteristics of the maps that are used in the gain calculation circuits 132 and 136 may be reversed. That is, the gains G2 and G3 are set to larger values as the axial force deviation ΔF increases.

Depending on product specifications or the like, the control apparatus 50 may have a configuration in which the differentiation steering control circuit 63 and the steering angle ratio change control circuit 62 are omitted. In this case, the target steering angle θ* calculated by the target steering angle calculation circuit 52 is directly used as the target pinion angle ($θ_p$*). That is, the steered wheels 16 and 16 are turned by an amount corresponding to the operation of the steering wheel 11.

Next, a vehicle control apparatus according to a third embodiment is described.

Depending on product specifications or the like, there is a demand that a response of the yaw rate to the steering operation be made more appropriate based on a change in the road condition in the tire grip limit range when the vehicle is traveling along a low-friction road or the like. In this example, the differentiation steering control circuit 63 has the following configuration.

Figure 8:
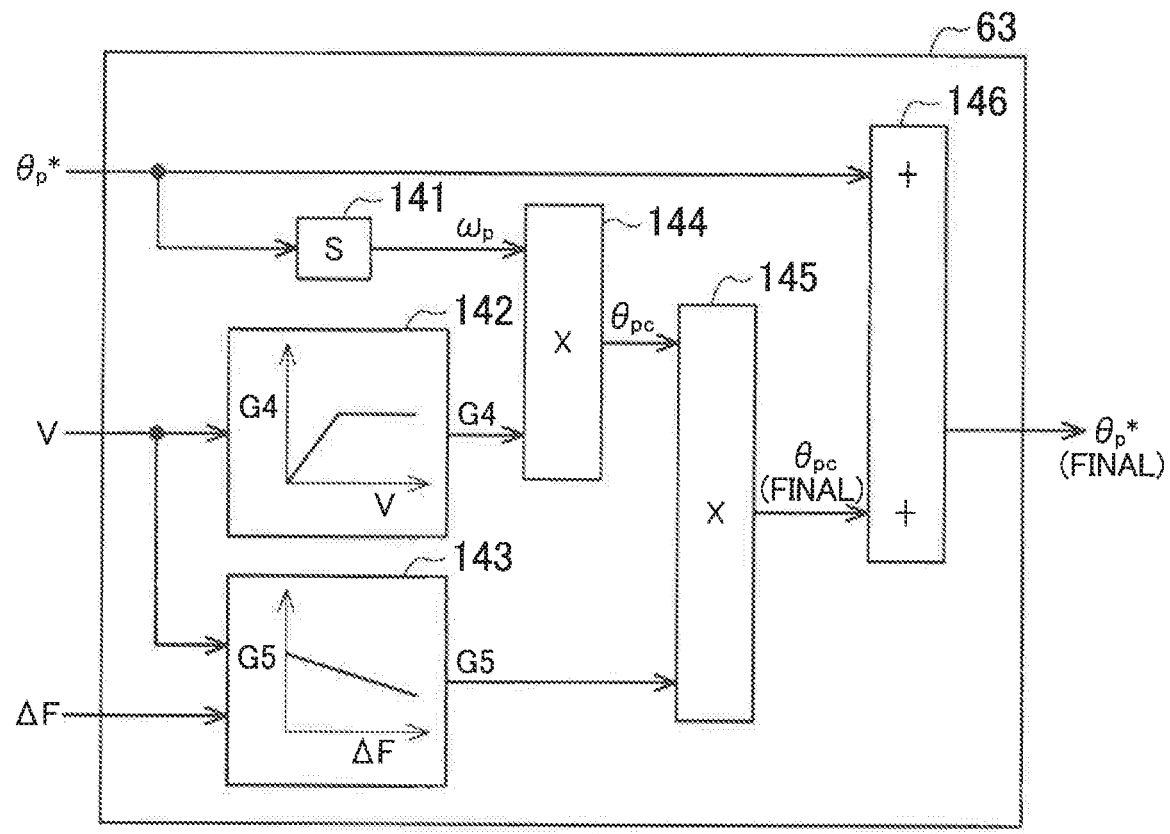
FIG. 8 is a control block diagram of a differentiation steering control circuit according to a third embodiment.

As illustrated in FIG. 8, the differentiation steering control circuit 63 includes a differentiator 141, two gain calculation circuits 142 and 143, two multipliers 144 and 145, and an adder 146. The differentiator 141 calculates the pinion angle speed $ω_p$, which is a change speed of the target pinion angle $\theta_p{}^*$, by differentiating the target pinion angle $\theta_p{}^*$ calculated by the steering angle ratio change control circuit 62.

The gain calculation circuit 142 calculates a gain G4 by using a map that defines a relationship between the vehicle speed V and the gain G4. The gain G4 is set to a larger value as the vehicle speed V increases when the vehicle speed V is lower than a predetermined speed. The gain G4 is set to a constant value irrespective of the vehicle speed V when the vehicle speed V is equal to or higher than the predetermined speed.

The gain calculation circuit 143 calculates a gain G5 by using a map that defines a relationship between the axial force deviation ΔF and the gain G5 depending on the vehicle speed V. The gain G5 is set to a smaller value as the axial force deviation ΔF increases.

The multiplier 144 calculates a correction angle $\theta_{pc}$ for the target pinion angle $\theta_p{}^*$ as a differentiation steering control amount by multiplying the pinion angle speed $\omega_p$ calculated by the differentiator 141 and the gain G4 together.

The multiplier 145 calculates a final correction angle $\theta_{pc}$ multiplying the correction angle $\theta_{pc}$ and the gain G5 together. The adder 146 calculates the final target pinion angle $\theta_p{}^*$ by adding together the target pinion angle $\theta_p{}^*$ calculated by the steering angle ratio change control circuit 62 (see FIG. 2) and the final correction angle $\theta_{pc}$ calculated by the multiplier 145.

According to this example, the correction angle $\theta_{pc}$ serving as the differentiation steering control amount is changed in response to the axial force deviation ΔF between the ideal axial force $F_i$ and the estimated axial force $F_e$, thereby attaining a more appropriate correction angle $\theta_{pc}$ (final) based on the road condition. The final target pinion angle $\theta_p{}^*$ is calculated by adding the correction angle $\theta_p{}^*$ based on the pinion angle speed $\omega_p$ to the target pinion angle $\theta_p{}^*$ calculated by the steering angle ratio change control circuit 62. That is, the target pinion angle $\theta_p{}^*$ calculated by the steering angle ratio change control circuit 62 is changed in response to the pinion angle speed $\omega_p$. Therefore, a steering operation response is secured based on the pinion angle speed $w_p$. The correction angle $\omega_{pc}$ based on the pinion angle speed $\omega_p$ is changed in response to the axial force deviation ΔF. Therefore, a steering operation response is obtained based on the axial force deviation ΔF. Since the axial force deviation ΔF reflects the road condition, a more appropriate steering operation response and furthermore a more appropriate yaw rate response are attained for the change in the road condition. The yaw rate response is a response from the time when the steered angle θt of each of the steered wheels 16 and 16 is changed along with an operation of the steering wheel 11 to the time when a yaw rate is generated based on the steered angle θt.

For example, when the vehicle is traveling along a low-friction road, the steering wheel 11 is more difficult to operate as the yaw rate response is quicker. According to this example, for example, the gain G5 and furthermore the final correction angle $\theta_{pc}$ serving as the differentiation steering control amount are set to smaller values as the axial force deviation ΔF increases along with a decrease in the road grip of the tire. The steering operation response and furthermore the yaw rate response decrease by an amount corresponding to the setting of the final correction angle $\theta_{pc}$ to a smaller value. Thus, the operability of the steering wheel 11 can be improved in the state in which the vehicle is traveling along a low-friction road. Further, it is possible to reduce the occurrence of a so-called grip loss, which is a loss of the road grip of the tire.

Next, a vehicle control apparatus according to a fourth embodiment is described.

Depending on product specifications or the like, there is a demand for a more natural yaw rate response based on the steering condition or the like. In this example, the differentiation steering control circuit 63 has the following configuration.

Figure 9:
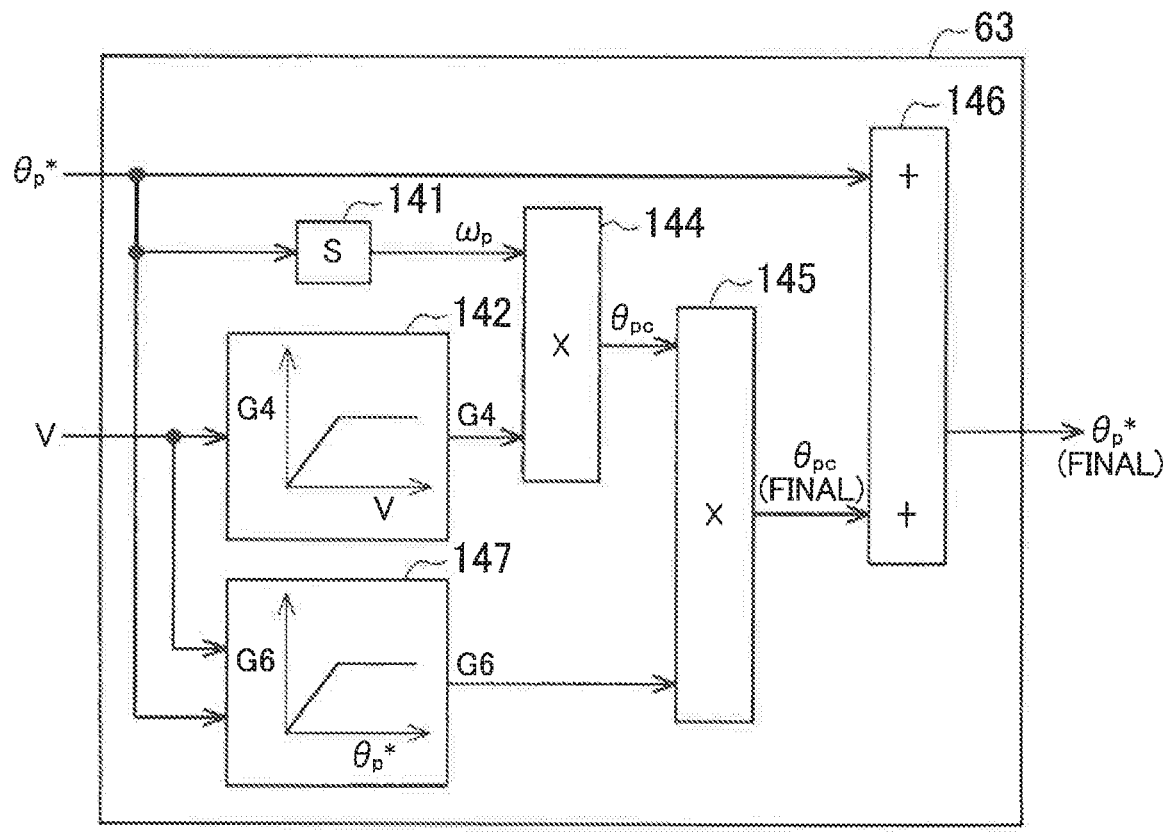
FIG. 9 is a control block diagram of a differentiation steering control circuit according to a fourth embodiment.

As illustrated in FIG. 9, the differentiation steering control circuit 63 includes a gain calculation circuit 147 in addition to the differentiator 141, the gain calculation circuit 142, the two multipliers 144 and 145, and the adder 146.

The gain calculation circuit 147 calculates a gain G6 by using a map that defines a relationship between the target pinion angle $\theta_p{}^*$ calculated by the steering angle ratio change control circuit 62 (see FIG. 2) and the gain G6 depending on the vehicle speed. The gain G6 is set to a larger value as the vehicle speed V increases when the vehicle speed V is lower than a predetermined speed. The gain G6 is set to a constant value irrespective of the vehicle speed V when the vehicle speed V is equal to or higher than the predetermined speed.

According to this embodiment, the correction angle $\theta_{pc}$ serving as the differentiation steering control amount for the target pinion angle $\theta_p{}^*$ is changed in response to the target pinion angle $\theta_p{}^*$ calculated by the steering angle ratio change control circuit 62 (see FIG. 2), thereby attaining a steering operation response and furthermore a yaw rate response based on the target pinion angle $\theta_p{}^*$.

For example, the yaw rate response decreases when the steering operation is started at a minute steering angle with respect to a neutral position (straightforward position) of the steering wheel 11. The yaw rate response increases along with an increase in the target pinion angle $\theta_p{}^*$. Therefore, a more natural yaw rate response is attained based on the actual steering amount (steered amount). Thus, the driver can attain a turning feel based on the actual steering amount (steered amount) through the driver's body. The operation of the steering wheel 11 is further facilitated.

If the yaw rate response for the steering operation to be started at a minute steering angle with respect to the neutral position of the steering wheel 11 is the same as a response for a steering operation to be performed at an angle larger than the minute steering angle, the driver may have discomfort due to, for example, a deviation between the actual steering amount (steered amount) and the turning feel attained through the driver's body.

The fourth embodiment may be modified as follows.

The gain calculation circuit 147 changes the correction angle $\theta_{pc}$ serving as the differentiation steering control amount in response to the target pinion angle $\theta_p{}^*$ calculated by the steering angle ratio change control circuit 62, but may change the correction angle $\theta_{pc}$ in response to the steering angle $\theta_s$, the pinion angle $\theta_p$, or the target steering angle $\theta^*$.

The vehicle model 72 may have a configuration in which one of the ideal axial three calculation circuit 91 and the estimated axial force calculation circuits 92, 93, and 94 is provided alone. In this case, the axial force blending calculation circuit 95 can be omitted. The axial force (F1 to F4) calculated by the axial force calculation circuit (91 to 94) is directly used as the final axial force $F_{sp}$.

Next, description is given of a vehicle control apparatus according to a fifth embodiment, which is applied to an electric power steering system (hereinafter abbreviated as "EPS"). Members similar to those of the first embodiment are represented by the same reference symbols to omit their detailed description.

Figure 10:
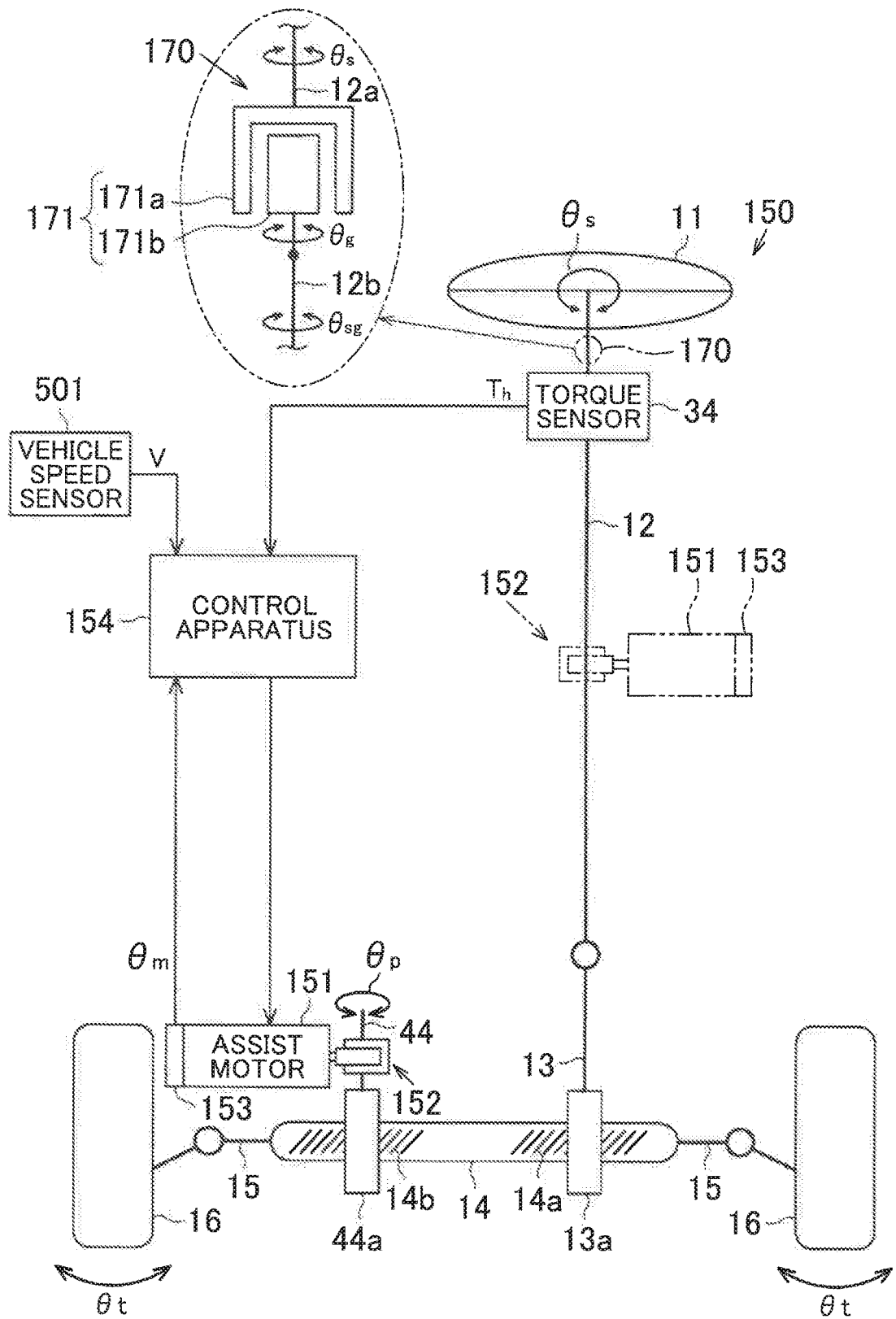
FIG. 10 is a configuration diagram of a steering system (electric power steering system) according to a fifth embodiment.

As illustrated in FIG. 10, an EPS 150 includes the steering shaft 12, the pinion shaft 13, and the steering operation shaft 14 that function as the power transmission path between the steering wheel 11 and each of the steered wheels 16 and 16. Reciprocating linear motion of the steering operation shaft 14 is transmitted to the right and left steered wheels 16 and 16 via the tie rods 15 coupled to both ends of the steering operation shaft 14.

The EPS 150 includes an assist motor 151, a speed reducing mechanism 152, the torque sensor 34, a rotation angle sensor 153, and a control apparatus 154 as a structure for generating a steering assist force (assist force). The rotation angle sensor 153 is provided on the assist motor 151 to detect its rotation angle $\theta_m$.

The assist motor 151 is a source of the steering assist force. For example, a three-phase brushless motor is employed as the assist motor 151. The assist motor 151 is coupled to the pinion shaft 13 via the speed reducing mechanism 152. The speed of rotation of the assist motor 151 is reduced by the speed reducing mechanism 152, and a rotational force obtained through the speed reduction is transmitted to the pinion shaft 13 as the steering assist force.

The control apparatus 154 executes assist control for generating a steering assist force based on the steering torque $T_h$ through energization control for the assist motor 151. The control apparatus 154 controls power supply to the assist motor 151 based on the steering torque $T_h$ detected through the torque sensor 34, the vehicle speed V detected through the vehicle speed sensor 501, and the rotation angle $\theta_m$ detected through the rotation angle sensor 153.

Figure 11:
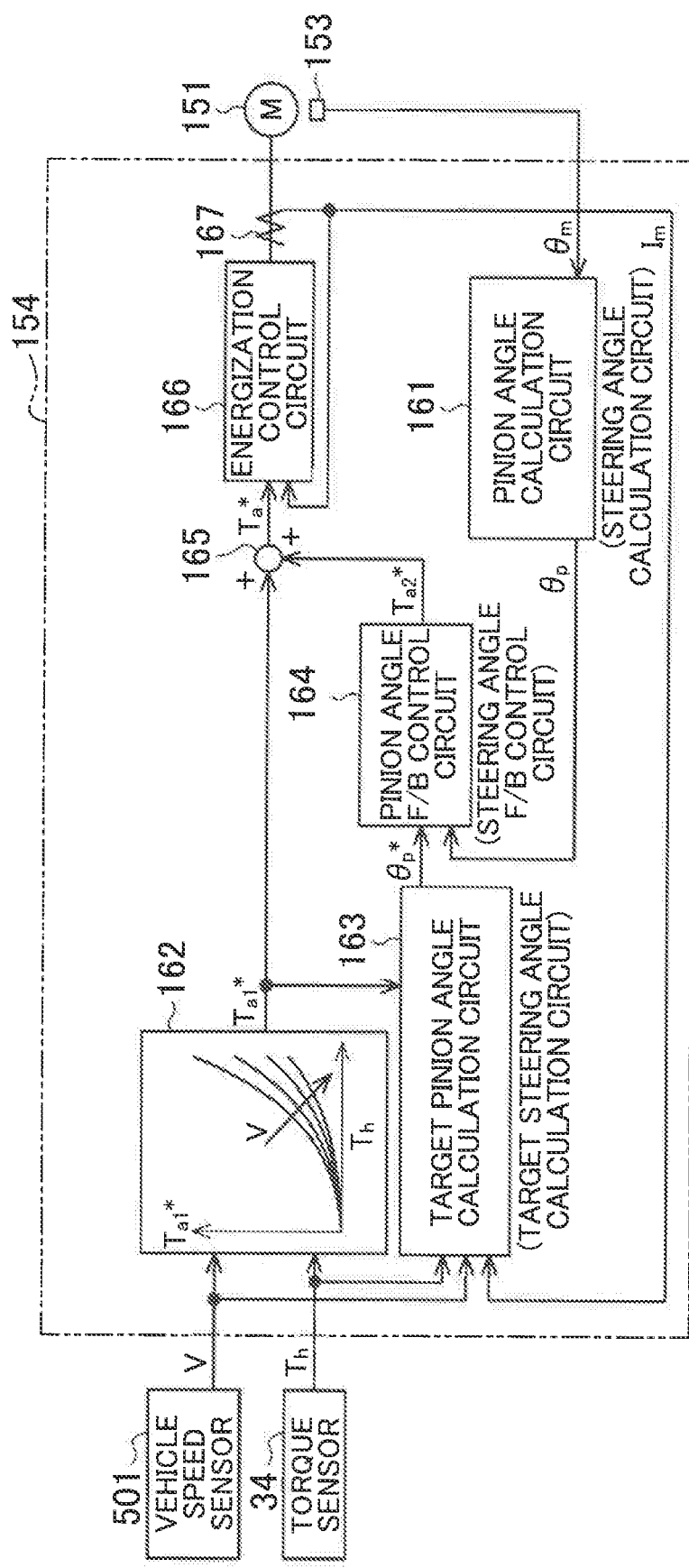
FIG. 11 is a control block diagram of an electronic control apparatus according to the fifth embodiment.

As illustrated in FIG. 11, the control apparatus 154 includes a pinion angle calculation circuit 161, a basic assist component calculation circuit 162, a target pinion angle calculation circuit 163, a pinion angle feedback control circuit (pinion angle F/B control circuit) 164, an adder 165, and an energization control circuit 166.

The pinion angle calculation circuit 161 acquires the rotation angle $\theta_m$ of the assist motor 151, and calculates a pinion angle $\theta_p$ that is the rotation angle of the pinion shaft 13 based on the acquired rotation angle $\theta_m$.

The basic assist component calculation circuit 162 calculates a basic assist component $T_{a1}^*$ based on the steering torque $T_h$ and the vehicle speed V. The basic assist component calculation circuit 162 calculates the basic assist component $T_{a1}^*$ by using a three-dimensional map that defines a relationship between the steering torque $T_h$ and the basic assist component $T_{a1}^*$ depending on the vehicle speed V. The basic assist component calculation circuit 162 sets the absolute value of the basic assist component $T_{a1}^*$ to a larger value as the absolute value of the steering torque $T_h$ increases and as the vehicle speed V decreases.

The target pinion angle calculation circuit 163 acquires the basic assist component $T_{a1}^*$ calculated by the basic assist component calculation circuit 162 and the steering torque $T_h$. The target pinion angle calculation circuit 163 has an ideal model that defines an ideal pinion angle based on a basic drive torque (input torque), which is the total sum of the basic assist component $T_{a1}^*$ and the steering torque $T_h$. The ideal model is obtained by modeling a pinion angle corresponding to an ideal steered angle based on the basic drive torque through an experiment or the like in advance. The target pinion angle calculation circuit 163 determines the basic drive torque by adding the basic assist component $T_{a1}^*$ and the steering torque $T_h$ together, and calculates a target pinion angle $\theta_p^*$ from the determined basic drive torque based on the ideal model. When the target pinion angle calculation circuit 163 calculates the target pinion angle $\theta_p^*$, the vehicle speed V and a current value $I_m$ are taken into consideration. The current value $I_m$ is detected through a current sensor 167 provided in a power supply path to the assist motor 151. The current value $I_m$ is a value of an actual current supplied to the assist motor 151.

The pinion angle feedback control circuit 164 acquires the target pinion angle $\theta_p^*$ calculated by the target pinion angle calculation circuit 163 and the actual pinion angle $\theta_p$ calculated by the pinion angle calculation circuit 161. The pinion angle feedback control circuit 164 performs proportional-integral-derivative (PID) control as feedback control for the pinion angle so that the actual pinion angle $\theta_p$ follows the target pinion angle $\theta_p^*$. That is, the pinion angle feedback control circuit 164 determines a deviation between the target pinion angle $\theta_p^*$ and the actual pinion angle $\theta_p$, and calculates a correction component $T_{a2}^*$ for the basic assist component $T_{a1}^*$ so as to eliminate the deviation.

The adder 165 calculates an assist command value $T_a^*$ by adding the correction component $T_{a2}^*$ to the basic assist component $T_{a1}^*$. The assist command value $T_a^*$ is a command value indicating a rotational force (assist torque) to be generated in the assist motor 151.

The energization control circuit 166 supplies electric power to the assist motor 151 based on the assist command value $T_a^*$. Specifically, the energization control circuit 166 calculates a current command value for the assist motor 151 based on the assist command value $T_a^*$. The energization control circuit 166 acquires the current value $I_m$ detected through the current sensor 167. Then, the energization control circuit 166 determines a deviation between the current command value and the actual current value $I_m$, and controls power supply to the assist motor 151 so as to eliminate the deviation. Thus, the assist motor 151 generates a torque based on the assist command value $T_a^*$. As a result, the steering is assisted based on the steering condition.

According to the EPS 150, the target pinion angle $\theta_p^*$ is set based on the ideal model from the basic drive torque (total sum of the basic assist component $T_{a1}^*$ and the steering torque $T_h$), and feedback control is performed so that the actual pinion angle $\theta_p$ equals the target pinion angle $\theta_p^*$. As described above, there is a correlation between the pinion angle $\theta_p$ and the steered angle θt of each of the steered wheels 16 and 16. Therefore, the turning operation of each of the steered wheels 16 and 16 based on the basic drive torque is also determined by the ideal model. That is, the steering feel of the vehicle is determined by the ideal model. Thus, a desired steering feel can be achieved by adjusting the ideal model.

The actual steered angle θt is kept as a steered angle θt based on the target pinion angle $\theta_p^*$. Therefore, there is attained an effect of suppressing a reverse input vibration that may be caused by a disturbance due to a road condition, braking, or the like. That is, even if a vibration is transmitted to a steering mechanism such as the steering shaft 12 via the steered wheels 16 and 16, the correction component $T_{a2}^*$ is adjusted so that the pinion angle $\theta_p$ equals the target pinion angle $\theta_p^*$. Therefore, the actual steered angle θt is kept as a steered angle θt based on the target pinion angle $\theta_p^*$ defined by the ideal model. Consequently, the transmission of the reverse input vibration to the steering wheel 11 is suppressed by assisting the steering in a direction in which the reverse input vibration is canceled.

The steering reaction force (tactile feedback to be acquired through a steering operation), which is a force (torque) to be applied in a direction opposite to the driver's steering direction, is only based on the target pinion angle $\theta_p^*$. That is, the steering reaction force does not change in response to a road condition such as a dry road or a low-friction road. Therefore, it is difficult for the driver to grasp the road condition as tactile feedback.

Figure 3:
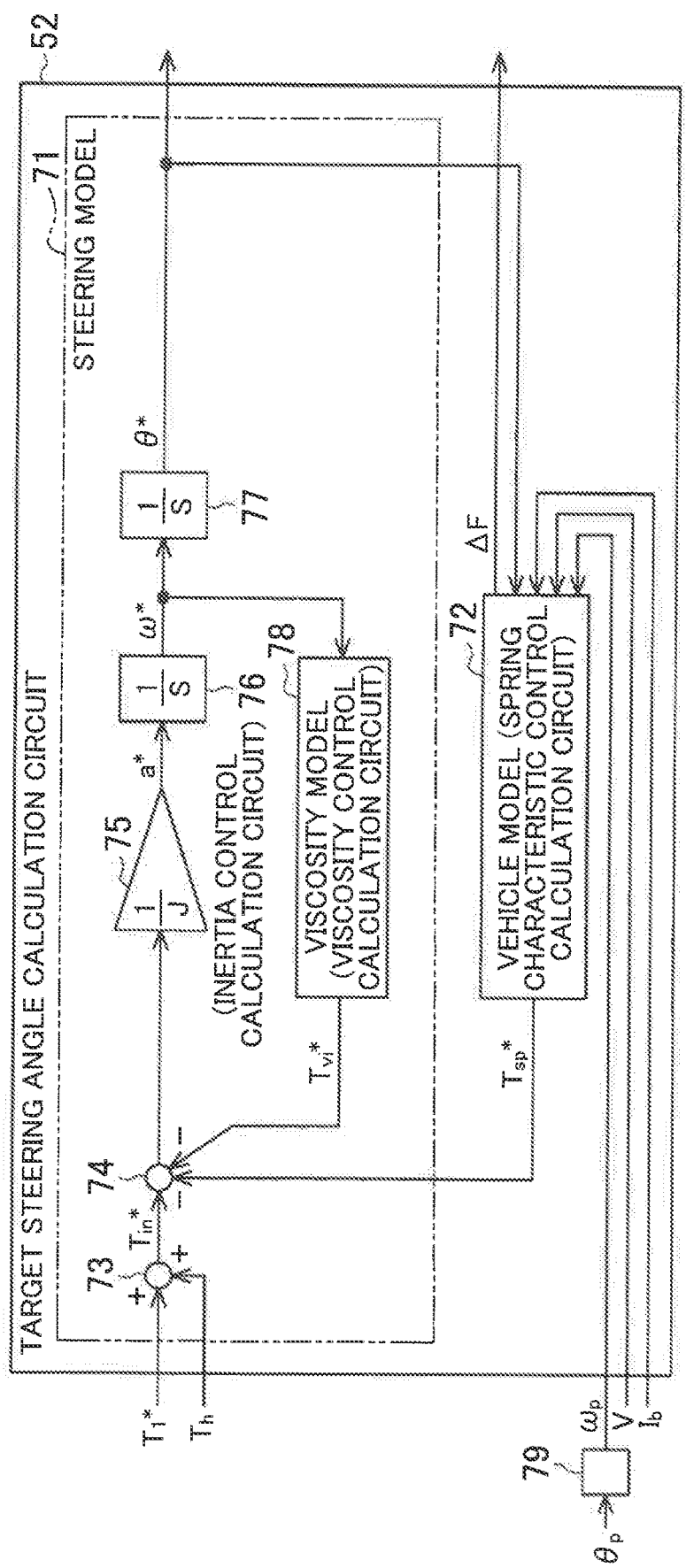
FIG. 3 is a control block diagram of a target steering angle calculation circuit according to the first embodiment.

In this example, the calculation function of the target steering angle calculation circuit 52 of the first embodiment is provided to, for example, the target pinion angle calculation circuit 163. The target pinion angle calculation circuit 163 has a functional configuration similar to that of the target steering angle calculation circuit 52 illustrated in FIG. 3. The target steering angle calculation circuit 52 acquires the target steering reaction force $T_1^*$, whereas the target pinion angle calculation circuit 163 of this example acquires the basic assist component $T_{a1}^*$. The target steering angle calculation circuit 52 acquires the current value $I_b$ of the current supplied to the steering operation motor 41, whereas the target pinion angle calculation circuit 163 of this example acquires the current value $I_m$ of the current supplied to the assist motor 151. The target pinion angle calculation circuit 163 acquires the steering torque $T_h$ and the vehicle speed V similarly to the target steering angle calculation circuit 52. The target steering angle calculation circuit 52 calculates the target steering angle $\theta^*$, whereas the target pinion angle calculation circuit 163 of this example calculates the target pinion angle $\theta_p^*$. Although a part of the signals to be acquired and the signal to be generated are different, details of internal calculation processing of the target pinion angle calculation circuit 163 are the same as those of the target steering angle calculation circuit 52.

As indicated by long dashed double-short dashed lines in FIG. 10, the EPS 150 may be provided with a variable-gear-ratio (VGR) mechanism 170. In order to improve the steering performance, the VGR mechanism 170 is provided with a VGR motor 171 on the steering shaft 12 (at a part between the steering wheel 11 and the torque sensor 34). By using the VGR motor 171, the ratio between the steering angle $\theta_s$ and the steered angle θt (gear ratio) is changed. A stator 171a of the VGR motor 171 is coupled to an input shaft 12a, which is a part of the steering shaft 12 on the steering wheel 11 side. A rotor 171b of the VGR motor 171 is coupled to an output shaft 12b, which is a part of the steering shaft 12 on the pinion shaft 13 side.

When the steering wheel 11 is rotated, the stator 171a of the VGR motor 171 is rotated by the same amount as that of the steering wheel 11. The control apparatus 154 causes the rotor 171b of the VGR motor 171 to be rotated based on the rotation of the steering wheel 11 and the vehicle speed V. A rotation angle $\theta_{sg}$ of the output shaft 12b relative to the input shaft 12a is represented by Expression (3) below.

$$\theta_{sg} = \theta_s + \theta_g \quad (3)$$

In Expression (3), "$\theta_s$" represents a steering angle, and "$\theta_g$" represents a rotation angle of the VGR motor.

By controlling the rotation angle $\theta_g$ of the VGR motor 171, an arbitrary gear ratio can be attained.

As parenthesized in FIG. 11, the target pinion angle calculation circuit 163 serving as the target steering angle calculation circuit calculates a target value of the sum of the steering angle $\theta_s$ and the rotation angle $\theta_g$ of the VGR motor 171, that is, the rotation angle $\theta_{sg}$ of the output shaft 12b relative to the input shaft 12a. When the target pinion angle calculation circuit 163 serving as the target steering angle calculation circuit calculates the target value of the rotation angle $\theta_{sg}$, the target pinion angle calculation circuit 163 uses the sum of the steering speed $\omega_s$ and the rotation speed of the VGR motor 171. The pinion angle feedback control circuit 164 serving as the steering angle feedback control circuit determines a deviation between the target value of the rotation angle $\theta_{sg}$ and the actual rotation angle $\theta_{sg}$, and calculates the correction component $T_{a2}^*$ for the basic assist component $T_{a1}^*$ so as to eliminate the deviation.

The control apparatus 154 of the EPS 150 including the VGR mechanism 170 is provided with a steering angle ratio change control circuit and a differentiation steering control circuit as parts for controlling the VGR motor 171. For example, the steering angle ratio change control circuit calculates a target rotation angle of the VGR motor 171 based on the steering angle $\theta_s$ and the vehicle speed V. The differentiation steering control circuit calculates a final target rotation angle by correcting the target rotation angle of the VGR motor 171 based on the steering speed $\omega_s$ and the vehicle speed V. Power supply to the VGR motor 171 is controlled through feedback control performed so that the actual rotation angle of the VGR motor 171 equals the target rotation angle.

A calculation function similar to that of the steering angle ratio change control circuit 62 illustrated in FIG. 6 may be provided to the steering angle ratio change control circuit serving as the part for controlling the VGR motor 171. A calculation function similar to that of the differentiation steering control circuit 63 illustrated in FIG. 8 or FIG. 9 may be provided to the differentiation steering control circuit serving as the part for controlling the VGR motor 171. The calculation function of the steering model 71 illustrated in FIG. 7 may be provided to the target pinion angle calculation circuit 163 of this example irrespective of whether the VGR mechanism 170 is provided. With this configuration, effects similar to those of the first to fourth embodiments can be attained as the control apparatus 154 of the EPS 150.

The fifth embodiment may be modified as follows.

In this example, the basic assist component calculation circuit 162 determines the basic assist component $T_{a1}^*$ based on the steering torque $T_h$ and the vehicle speed V, but may determine the basic assist component $T_{a1}^*$ based on the steering torque $T_h$ alone.

In this example, the electric power steering system (EPS) 150 configured to apply a steering assist force to the steering operation shaft 14 is taken as an example, but another type of EPS configured to apply a steering assist force to the steering shaft may be employed instead. Details are as follows.

As indicated by long dashed double-short dashed lines in FIG. 10, the assist motor 151 is coupled to the steering shaft 12 instead of the steering operation shaft 14 via the speed reducing mechanism 152. The pinion shaft 44 may be omitted. In this case, the control apparatus 154 executes feedback control for the steering angle $\theta_s$ instead of the feedback control for the pinion angle $\theta_p$.

That is, as parenthesized in FIG. 11, the pinion angle calculation circuit 161 functions as a steering angle calculation circuit configured to calculate a steering angle $\theta_s$ based on the current value $I_m$ of the assist motor 151. The target pinion angle calculation circuit 163 functions as a target steering angle calculation circuit configured to calculate a target steering angle that is a target value of the steering angle $\theta_s$ based on the steering torque $T_h$, the vehicle speed V, the basic assist component $T_{a1}^*$, and the current value $I_m$. The target steering angle calculation circuit basically has a configuration similar to that of the target steering angle calculation circuit 52 illustrated in FIG. 3. The differentiator 79 provided in the control apparatus 154 calculates a steering speed $\omega_s$ by differentiating the steering angle $\theta_s$. The pinion angle feedback control circuit 164 functions as a steering angle feedback control circuit configured to determine a deviation between the target steering angle and the actual steering angle $\theta_s$, and calculate a correction component $T_{a2}^*$ for the basic assist component $T_{a1}^*$ so as to eliminate the deviation.

The embodiments may be modified as follows.

In the first to fourth embodiments, the steer-by-wire type steering system 10 may have a configuration in which the clutch 21 is omitted.

In the first to fifth embodiments, the torque sensor 34 is provided on the steering shaft 12, but may be provided on the pinion shaft 13. The position where the torque sensor 34 is provided is not limited as long as the steering torque $T_h$ can be detected.

In the first to fifth embodiments, the vehicle model 72 may have a configuration in which at least one of the two estimated axial force calculation circuits 93 and 94 is omitted. That is, the axial force $F_p$ may be calculated by summing up at least the axial force F1 (estimated axial force) estimated and calculated by the estimated axial force calculation circuit 92 and the ideal axial force $F_i$ at a predetermined blending ratio. The final axial force $F_{sp}$ is calculated by summing up the axial force $F_{pre}$, and the imaginary rack end axial force $F_{end}$.

In the first to fifth embodiments, the blending ratio $D_j$ of the estimated axial force $F_e$ calculated by the first calculation circuit 95a may be determined by using at least one of the blending ratios Dcc, $D_d$, $D_e$, $D_f$, $D_g$, $D_h$, and $D_i$ calculated by the respective blending ratio calculation circuits (108 to 114). When one of the blending ratios is used alone, the one blending ratio is directly used as the blending ratio $D_j$ of the estimated axial force $F_e$.

In the first to fifth embodiments, depending on product specifications, the vehicle speed V need not be taken into consideration in the maps that are used in the gain calculation circuits 122, 132, 136, and 143 configured to calculate gains based on the axial force deviation $\Delta F$.

In the first to fifth embodiments, the gain calculation circuits 122, 132, 136, and 143 calculate gains by using the axial force deviation $\Delta F$ that is a difference between the ideal axial force $F_i$ and the estimated axial force $F_e$, but a difference between one of the following axial forces (A1) to (A4) and the ideal axial force $F_i$ may be used as the axial force deviation $\Delta F$.

(A1) The axial force F1 calculated by the estimated axial force calculation circuit 92. The axial force F1 is based on the current value $I_b$ of the steering operation motor 41.

(A2) The axial force F2 estimated and calculated by the estimated axial force calculation circuit 93. The axial force F2 is based on the lateral acceleration LA.

(A3) The axial force F3 estimated and calculated by the estimated axial force calculation circuit 94. The axial force F3 is based on the yaw rate YR.

(A4) The axial force $F_c$ calculated by the multiplier 103 of the axial force blending calculation circuit 95. The axial force $F_c$ is obtained by summing up the axial forces F2 and F3 at predetermined blending ratios.

In this case, the subtractor 107 illustrated in FIG. 5 may acquire the axial force F1, the axial force F2, the axial force F3, or the axial force $F_c$ in place of the estimated axial force $F_e$. As indicated by long dashed double-short dashed lines in the bottom left of FIG. 5, a subtractor 107a may be added to the axial force blending calculation circuit 95, and the added subtractor 107a may calculate a difference between the ideal axial force $F_i$ and the axial force F1, the axial force F2, the axial force F3, or the axial force $F_c$. FIG. 5 illustrates an example in which the added subtractor 107a acquires the axial force F1.

What is claimed is:

1. A vehicle control apparatus configured to control a motor based on a command value to be calculated based on a steering condition, the motor being a source of a driving force to be applied to a steering mechanism of a vehicle, the vehicle control apparatus comprising:
   a first calculation circuit configured to calculate a first component of the command value based on at least a steering torque;
   a second calculation circuit configured to calculate a target rotation angle of a rotating body based on a basic drive torque, which is a total sum of the steering torque and the first component, the rotating body being configured to rotate in association with a turning operation of a steered wheel; and
   a third calculation circuit configured to calculate a second component of the command value through feedback control performed so that an actual rotation angle of the rotating body equals the target rotation angle, wherein
   the second calculation circuit includes:
      an ideal axial force calculation circuit configured to calculate an ideal axial force based on the target rotation angle;
      an estimated axial force calculation circuit configured to calculate, as an estimated axial force, an axial force applied to the steered wheel based on a state variable that reflects vehicle behavior or a road condition;
      a blending calculation circuit configured to calculate a final axial force to be reflected in the basic drive torque as a reaction force component for the basic drive torque by summing up a value obtained by multiplying the ideal axial force by a blending ratio and a value obtained by multiplying the estimated axial force by a blending ratio, the blending ratios being set individually based on the state variable that reflects the vehicle behavior or the road condition or based on the steering condition; and
      a subtractor configured to calculate an axial force deviation, which is a difference between the ideal axial force and the estimated axial force, and
   the second calculation circuit is configured to change the target rotation angle in response to the axial force deviation.

2. The vehicle control apparatus according to claim 1, further comprising a fourth calculation circuit configured to calculate a first correction angle for the target rotation angle so as to set a steering angle ratio, which is a ratio of a steered angle of the steered wheel to a steering angle, wherein
   the fourth calculation circuit changes the first correction angle in response to the axial force deviation such that the target rotation angle is changed.

3. The vehicle control apparatus according to claim 1, wherein
   the second calculation circuit includes:
      an inertia control calculation circuit configured to calculate an angular acceleration by multiplying the basic drive torque by an inverse of a moment of inertia;
      a first integrator configured to calculate an angular speed by integrating the angular acceleration;
      a second integrator configured to calculate the target rotation angle by integrating the angular speed; and
      a viscosity control calculation circuit configured to calculate a viscosity component of the basic drive torque based on the angular speed, and
   the target rotation angle is changed through at least one of an operation in which the inertia control calculation circuit changes the angular acceleration in response to the axial force deviation and an operation in which the viscosity control calculation circuit changes the viscosity component in response to the axial force deviation.

4. The vehicle control apparatus according to claim 1, further comprising:
a fourth calculation circuit configured to calculate a first correction angle for the target rotation angle so as to set a steering angle ratio, which is a ratio of a steered angle of the steered wheel to a steering angle; and
a fifth calculation circuit configured to calculate a second correction angle for the target rotation angle that reflects the first correction angle based on a change speed of the target rotation angle, which is obtained by differentiating the target rotation angle that reflects the first correction angle, wherein
the fifth calculation circuit changes the second correction angle in response to the axial force deviation such that the target rotation angle is changed.

5. The vehicle control apparatus according to claim 1, wherein
the steering mechanism includes a steering operation shaft configured to turn the steered wheel by applying a steering operation force generated by a steering operation motor, and
the estimated axial force is one of the following estimated axial forces:
a. a first estimated axial force calculated based on a current value of the steering operation motor;
b. a second estimated axial force calculated based on a lateral acceleration applied to the vehicle;
c. a third estimated axial force calculated based on a yaw rate, which is a speed at which the vehicle makes a turn;
d. a fourth estimated axial force obtained by summing up a value obtained by multiplying the second estimated axial force by a blending ratio and a value obtained by multiplying the third estimated axial force by a blending ratio, the blending ratios being set individually based on the vehicle behavior; and
e. a fifth estimated axial force obtained by summing up a value obtained by multiplying the first estimated axial force by a blending ratio, a value obtained by multiplying the second estimated axial force by a blending ratio, and a value obtained by multiplying the third estimated axial force by a blending ratio, the blending ratios being set individually based on the vehicle behavior.

6. The vehicle control apparatus according to claim 1, wherein the steering mechanism includes:
a pinion shaft that serves as the rotating body and is mechanically separated from a steering wheel;
a steering operation shaft configured to turn the steered wheel in association with rotation of the pinion shaft;
a reaction motor that is a control target, the reaction motor serving as the motor and being configured to generate, based on the command value, a steering reaction force as the driving force to be applied to the steering wheel, the steering reaction force being a torque in a direction opposite to a steering direction; and
a steering operation motor that is a control target, the steering operation motor serving as the motor and being configured to generate a steering operation force for turning the steered wheel, the steering operation force being applied to the pinion shaft or the steering operation shaft.

7. The vehicle control apparatus according to toy claim 1, wherein
the steering mechanism includes:
a pinion shaft that serves as the rotating body and is configured to operate in association with a steering wheel; and
a steering operation shaft configured to turn the steered wheel in association with rotation of the pinion shaft, and
the motor is an assist motor configured to generate a steering assist force as the driving force to be applied to the pinion shaft, the steering assist force being a torque in a direction identical to a steering direction.

8. A vehicle control apparatus configured to control a motor based on a command value to be calculated based on a steering condition, the motor being a source of a driving force to be applied to a steering mechanism of a vehicle, the vehicle control apparatus comprising:
a first calculation circuit configured to calculate a first component of the command value based on at least a steering torque;
a second calculation circuit configured to calculate a target rotation angle of a rotating body based on a basic drive torque, which is a total sum of the steering torque and the first component, the rotating body being configured to rotate in association with a turning operation of a steered wheel;
a third calculation circuit configured to calculate a second component of the command value through feedback control performed so that an actual rotation angle of the rotating body equals the target rotation angle;
a fourth calculation circuit configured to calculate a first correction angle for the target rotation angle so as to set, based on a vehicle speed, a steering angle ratio, which is a ratio of a steered angle of the steered wheel to a steering angle; and
a fifth calculation circuit configured to calculate a second correction angle for the target rotation angle that reflects the first correction angle based on a change speed of the target rotation angle, which is obtained by differentiating the target rotation angle that reflects the first correction angle, wherein
the fifth calculation circuit is configured to change the second correction angle in response to the target rotation angle calculated by the second calculation circuit or the target rotation angle that reflects the first correction angle.

9. The vehicle control apparatus according to claim 8, wherein the steering mechanism includes:
a pinion shaft that serves as the rotating body and is mechanically separated from a steering wheel;
a steering operation shaft configured to turn the steered wheel in association with rotation of the pinion shaft;
a reaction motor that is a control target, the reaction motor serving as the motor and being configured to generate, based on the command value, a steering reaction force as the driving force to be applied to the steering wheel, the steering reaction force being a torque in a direction opposite to a steering direction; and
a steering operation motor that is a control target, the steering operation motor serving as the motor and being configured to generate a steering operation force for turning the steered wheel, the steering operation force being applied to the pinion shaft or the steering operation shaft.

10. The vehicle control apparatus according to claim 8, wherein
   the steering mechanism includes:
      a pinion shaft that serves as the rotating body and is configured to operate in association with a steering wheel; and
      a steering operation shaft configured to turn the steered wheel in association with rotation of the pinion shaft, and
   the motor is an assist motor configured to generate a steering assist force as the driving force to be applied to the pinion shaft, the steering assist force being a torque in a direction identical to a steering direction.

\* \* \* \* \*